United States Patent [19]

Cotton et al.

[11] Patent Number: 4,630,110
[45] Date of Patent: Dec. 16, 1986

[54] SURVEILLANCE SYSTEM

[75] Inventors: Roger E. Cotton, Snellville; Eugene H. Lowe, Doraville, both of Ga.

[73] Assignee: Supervision Control Systems, Inc., Norcross, Ga.

[21] Appl. No.: 583,045

[22] Filed: Feb. 15, 1984

[51] Int. Cl.[4] .............................................. H04N 7/18
[52] U.S. Cl. .................................... 358/108; 340/500; 200/86 R
[58] Field of Search ................ 358/93, 108, 105, 183, 358/181; 200/86 R, 85 R, 5 A; 73/172; 340/309.15, 506, 521, 500

[56] References Cited

U.S. PATENT DOCUMENTS

| | | | |
|---|---|---|---|
| 2,773,148 | 12/1956 | Roby et al. | 200/86 R |
| 3,207,842 | 9/1965 | Flagle | 358/183 |
| 3,300,770 | 1/1967 | Brousseau et al. | 340/280 |
| 3,531,588 | 9/1970 | Karchner | 358/105 |
| 3,590,151 | 6/1971 | Keith | 358/105 |
| 3,686,434 | 8/1972 | Lemelson | 178/6.6 A |
| 3,740,466 | 6/1973 | Marshall et al. | 358/105 |
| 3,742,133 | 6/1973 | O'Sullivan | 178/6 |
| 3,852,735 | 12/1974 | Matsuda et al. | 340/258 |
| 3,885,090 | 5/1975 | Rosenbaum | 358/108 |
| 4,001,881 | 1/1977 | Folsom | 360/5 |
| 4,051,524 | 9/1977 | Baxter | 358/108 |
| 4,054,752 | 10/1977 | Dennis, Jr. et al. | 179/5 R |
| 4,145,715 | 3/1979 | Clever | 358/108 |
| 4,148,062 | 4/1979 | Kamin | 358/108 X |
| 4,237,483 | 12/1980 | Clever | 358/108 |
| 4,249,206 | 2/1981 | Roscoe | 358/108 X |
| 4,337,481 | 6/1982 | Mick et al. | 358/108 X |
| 4,511,886 | 4/1985 | Rodriguez | 358/108 X |

Primary Examiner—Michael A. Masinick
Assistant Examiner—Victor R. Kostak
Attorney, Agent, or Firm—Jones & Askew

[57] ABSTRACT

An improved surveillance system for recording and monitoring video information from a plurality of cameras (20) and data from a plurality of electronic cash registers (21). An intelligent controller (28) controls operation of the entire system. Data concerning all cash register transactions are stored in a memory (78) and video signals are displayed on a monitor (27) and/or recorded on a VCR (26). A keyboard (30) is provided so that the user can generate reports, and selectively vary parameters which will trigger alarm events. A novel entrance door mat (22) is provided having a pair of switch arrays (46, 47) separated by a dead zone (48) is provided and the state of the switches is periodically read by the CPU. Control logic (FIGS. 9, 10) executed by the CPU detects closures of the switches in the mat to determine when customers are passing into and out of the store, as well as maintaining a count of the net number of customers at the store at any given time. A video multiplexer (250) changes the display format and the video signals on the monitor (27) and recorded by the VCR (26). Control of the multiplexer (256) is accomplished by a second multiplexer (258) which allows the video multiplexer to be controlled by the outputs of a read only memory (260) addressed by modified scan counts (195) from a CRT controller (165). Alternately, the format of the video display from the video multiplexer can be controlled by the CPU through words written into a register (268) connected to the second multiplexer (258). The apparatus changes the video display format from a normal split screen format in which portions of the video signals from all cameras are displayed to a full screen format of a particular camera. The system also includes apparatus for detecting the period of time for which a cash drawer of one of the ECRs is open and control logic (287) causes an alarm event to be generated turning on the recorder and selecting a full screen display format.

13 Claims, 13 Drawing Figures

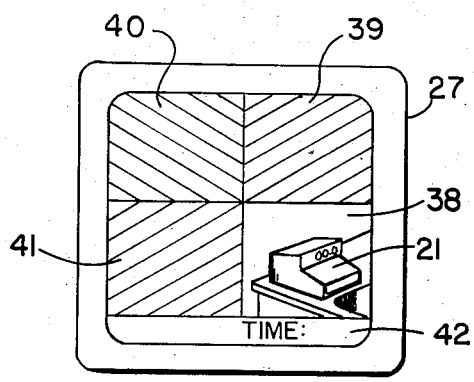
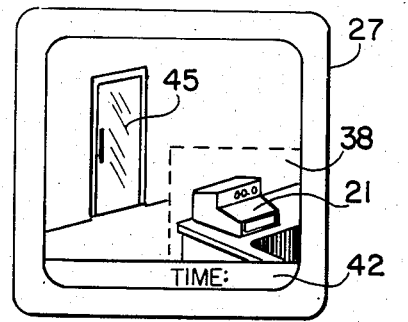
Fig. 3A        Fig. 3B
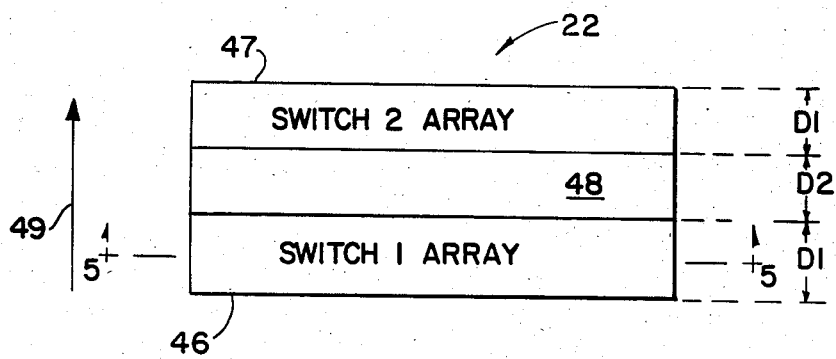
Fig. 4
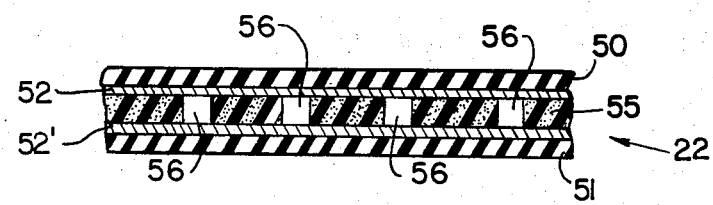
Fig. 5

SURVEILLANCE SYSTEM

TECHNICAL FIELD

The present invention relates to surveillance systems, particularly to surveillance systems for providing real time video displays, real and lapsed time video recording, and information gathering apparatus particularly adapted to be used for monitoring retail sales outlets.

BACKGROUND OF THE INVENTION

The use of surveillance systems for remotely monitoring and/or recording images for later viewing has been used for many years since the invention of basic television apparatus. Such equipment is used to monitor and/or record information concerning the identity of personnel entering restricted areas in a wide variety of applications. One of the most common uses of such surveillance equipment is to monitor retail sales outlets including, but not limited to, check-out stations where a customer exchanges money for goods in making a retail purchase. In particular, problems of theft, shoplifting and the like, have had severe impacts on the cost of goods in the United States. Losses suffered by retail sales outlets from shoplifting and other forms of theft are eventually passed on to the consumer in the form of higher prices. The retail operator who can successfully reduce its shoplifting and theft losses has a significant advantage over its competitors in that the same profit margins can be obtained while charging the customer lower prices.

A significant form of theft suffered by retailers is that known as "under-ringing". This involves a conspiratorial arrangement between an employee of the retail outlet and a third person. It is executed by having a third person bring goods to a check-out station, which includes a cash register, staffed by a dishonest employee. The employee operating the cash register will ring up charges that are below the actual price of the goods in question. The goods will be appropriately wrapped or bagged, and the third party will leave the store after having paid only a fraction of the actual price of the goods.

To the casual observer, the transaction between the dishonest employee and the third party is in all respects normal, goods are passing by the check-out stand, prices are being rung up and money exchanges hands. It has been known in the prior art for some period of time to monitor amounts rung on electronic cash registers while, at the same time, observing through a video monitor (either in real time or reviewing a tape of a transaction) the goods passing the check-out stand.

Also, surveillance systems have been widely used in retail outlets, banks and other locations to aid in apprehending criminals conducting a less subtle form of theft, such as armed robbery. For example, it has been known in the art to have either "panic button" alarm switches, or drawer switches in a cash register drawer wherein a particular piece of currency or the like is never to be removed in normal operation. Application of the panic button switch is apparent.

In the latter example, the piece of currency or the like will have an insulating property between two conductive contact materials which appear to the observer to be normal weighed levers for holding currency in place in a cash drawer. Upon the occurrence of a theft, the employee is instructed to pull all of the bills from the slot containing the special contacts and an alarm signal is produced causing one of several events to occur. Normally the event will be either the turning on of a video tape recorder to which a monitoring camera is attached, a change of mode of the video recorder from a lapsed time mode to a real time mode, or the like. One prior art system uses a continuous loop recorder, thus providing a predetermined "time window" of real time recording. Upon the receipt of such an alarm condition, recording terminates after a predetermined period of time so that a record of the event which caused the alarm condition will be maintained, rather than being erased as the continuous loop recycles through the recorder.

All of these devices have proved useful for their intended purpose. However, experience has shown that it is difficult to design a surveillance system which fully takes into account common phenomena of human behavior and perception so that the maximum amount of useful and important information is recorded in a fashion in which it will not be inadvertently ignored by a person monitoring the information, either in real time or during some form of playback at a later time. Thus, the basic problem of designing a surveillance system having the maximum possible utility is one of designing event detection apparatus which will activate recorders, change a mode of recording, or change the nature of a video real time display, to attract the attention of the person monitoring the events. This may be generically thought of as a design problem for properly scaling and defining the alarm events which cause one of the aforementioned responses (recording, changing recorder mode, or changing the nature of the video display) to occur.

Needless to say, the problem of collecting all possible information about occurrences in a monitored area is technically trivial. All one needs to do is provide an appropriate number of cameras, an appropriate number of recorders, and turn all of them on in a real time mode so that all possible events are recorded. This is impractical for reasons of cost, and the fact that nothing is particularly brought to the attention of a person monitoring such a system. In other words, the indiscriminate recording of all information is hardly an improvement over having a person simply standing in the monitored area.

Thus, the problem of designing a useful surveillance system becomes one of defining the conditions which will be considered an alarm event to either turn on a recorder or change a display so that the event is brought to the attention of the monitoring person. If events are defined so that a large number of alarm events in the system occur when experience shows that very few of these events are either out of the ordinary or cause for concern, the monitoring party naturally becomes insensitive to the events. In other words, multiple repetitions of events which should not cause concern to the operators of the retail outlet will quickly cause them to lose interest in monitoring each of the recorded alarm events. For example, if the camera is turned every time a cash register drawer is opened (opening of the drawer being the only criteria), it can become quite tiresome to monitor a very large number of normal transactions looking for something out of the ordinary. Experience has shown that the natural tendency of persons monitoring such a display is to become inattentive, and an event which is out of the ordinary or problematic can be missed. At the other extreme, the conditions defining an alarm event should not be so severe that there is a high probability that an event which should be recorded or monitored will be missed.

The surveillance system of the present invention is particularly suited for use in retail outlets, although it can be used in a wide variety of applications. Prior art systems designed to be used in retail outlets have been directed almost exclusively to monitoring thefts, either some form of employee dishonesty or some form of robbery by a third party. Prior art surveillance systems have not addressed the ability of such a system to monitor events which fall outside the standard operating procedures, even though no dishonest act may be occurring. Furthermore, prior art systems have not been designed with alarm events defined that may be extremely useful in gathering data on pertinent behavior of store employees. This may be used to define appropriate standard operating procedures or identify dangerous situations which do not necessarily involve employee dishonesty.

This type of problem can become extremely acute in an environment such as a convenience store which is often operated by a single employee during periods of the early morning or late evening when there is a low amount of customer traffic. Proper procedures by employees at check-out stands in such retail operations are essential to prevent mistakes on the part of the employee, deception on the part of the customer, and theft. For example, a number of dishonest people, given the opportunity, will lie to a store employee concerning the amount tendered if proper procedures for ringing up the amount tendered, and handling of the currency actually tendered to the casher, are not followed. Similarly, many thieves are aware of the fact that prison sentences for armed robbery are much more severe than those for other forms of theft, and wil grab money from an open cash drawer and quickly exit the establishment if the opportunity presents itself, but they will not resort to the use of weapons.

Also, under many conditions of operation of a small retail establishment, knowledge of the number of people either in the store at a particular time, or the total number of people who have entered the store during a period of elapsed time, can become imporatant in monitoring store receipts and video signals for detection of employee dishonesty. Prior art surveillance systems have attempted to approximate this solely by using switches which detect openings and closures of a door into the establishment. Common experience teaches that the relationship between the number of openings and closures of an entrance door and the number of people in the store can vary widely. For example, if a group of three or four people enter a convenience store at one time, this will often be accomplished with only one opening of the entrance door, while all the people pass through, the last person allowing the door to shut. Furthermore, experience has taught that, in the convenience store environment, the entry of three or four people into the store at one time is a condition which ought to be watched carefully. A number of dishonest people will often conspire to shoplift by arranging to have one or two people occupy the attention of the cashier while other members of the party abscond with the goods.

If cameras are turned on every time there is a door opening or closure, the aforementioned problem of recording too much information will often be presented. Furthermore, merely counting door closures does not give reliable information as to the accumulated number of people who may be on the premises at any one time. For example, detection of a door opening and closing might indicate to a surveillance system that a single customer had entered. Some time later, another opening and closure may be detected. In the prior art systems, it is virtually impossible to ascertain whether the first customer has left, leaving the store empty of customers, or whether a second customer (or a plurality of additional customers) has entered the premises.

In summary, there is a need in the prior art for providing a surveillance system in which alarm events are defined so that they are useful, not only for detecting theft problems, but also for gathering data, and monitoring the procedures executed by employees. This information can serve as an effective management tool for the operation of the establishment in which the system is placed. There is a further need to provide such a system in which the alarm events are defined so that only events which are out of the ordinary or fall outside a predefined procedure are recorded in real time or fully displayed on a monitor.

There is a further need in the art of surveillance systems to provide a surveillance system which can more accurately monitor the net number of customers or potential customers within the establishment in a manner which is more accurate than counting door openings and closures.

SUMMARY OF THE INVENTION

The present invention fulfills these needs in the art of surveillance systems by providing an integrated surveillance system which is useful both for the conventional purposes of detecting and/or recording theft events, and which can be used to monitor operating procedures of employees without requiring undue amounts of real time recording. The present invention provides this arrangement in a fashion which is interlaced in time with more standard operational features of a surveillance system, such as lapsed time recording at predetermined time intervals.

It is an object of the present invention to provide an arrangement in a surveillance system which can accurately provide a directional count indicative of the net number of people in the store at a given time.

The present invention accomplishes this goal by providing a novel switching apparatus interconnected to an intelligent controller. The switching apparatus includes a pair of spaced apart areas of a floor mat having switches imbedded therein. A sufficient predetermined spacing is provided between the planar areas carrying the switches so that most people walking normally through the entranceway at which the mat is placed will step on a switch from one portion with one foot, and the other portion with the other foot, while taking a stride.

Thus, a sequence of switch closings is normally encountered in which one switch will become closed when the first foot strikes it, both switches will become closed as the person puts their other foot forward, followed by a state in which the second switch is closed but the first is not. Naturally, the order of closure is reversed when a person walks across the mat in the opposite direction. It is also within the scope of the present invention to provide predetermined time intervals between switch closures so that the direction of travel of a person crossing the mat can be determined.

It is also an object of the present invention to provide, both in a real time video display and in information recorded on video tape, a multiplexed video screen display by which images from multiple cameras may be simultaneously displayed in a split screen format. Furthermore, the intelligent controller of the present invention changes the display format in response to detection of an alarm condition by changing the display so that the screen is filled entirely with the image from a particular camera best suited to visually record images of the device which generated the alarm input. In the preferred form of the present invention, the split screen format is generated by multiplexing only a portion of the raster from each of a set of cameras onto the screen. Then, rather than providing a reduced image of the full field of view of the camera, the portion of the screen devoted to each camera displays in a full size format a portion of the field of view of the particular camera. This allows the cameras to be arranged so that an advantageous full field of view will be displayed when the display mode is switched in response to an alarm event. This is described more particularly in the detailed description below.

Furthermore, it is an object of the present invention to provide an intelligent controller for a surveillance system which will maintain a record of an expected total amount of money in a cash drawer at any given time. This is particularly useful in retail operations, such as convenience stores, which require clerks to make money drops when the amount of cash in the drawer exceeds a predetermined amount.

One of the principal objects of the present invention is to provide an improved apparatus for defining alarm events which are used to control operation of a video monitor and/or a video recorder. In particular, the inventors have found that using timing apparatus in connection with apparatus for detecting switch closures can define alarm events usable in a surveillance system which overcome some of the above-noted drawbacks of the prior art. In particular, the present invention is one in which alarm events are defined by the failure of an expected second switch closure condition to take place within a predetermined time following a first switch closure condition.

One example is that the present invention defines an alarm condition when the cash register drawer fails to close within a predetermined period of time after it is opened. In applications in which the present invention has been used, it has been found that this condition is worthy of note because it shows either that an employee is leaving the cash drawer open too long, allowing the possibility of a dishonest customer grabbing money from the drawer, or that the employee is being forced to leave the drawer open too long, so that an armed thief may remove the contents.

In connection with this aspect of the invention, the preferred form provides a device in which the user can selectively program the maximum time between closures of the cash drawer. The alarm event to be triggered if the drawer is open for a longer period of time. From this it follows that the present invention is particularly useful in gathering data about habits of employees, particularly their habits of leaving a cash drawer open.

Furthermore, the present invention also provides apparatus which defines alarm events which can occur from an improper sequence of switch closures. For example, many retail establishments require cashiers to ring up the amount of the total sale, and the amount tendered prior to opening of the cash drawer. In using the present invention, the user may program the intelligent controller so that a response to any opening of the cash drawer which is not first preceded by operation of the amount tendered key of the cash register is an alarm event which should be recorded for special attention.

From the foregoing it will be appreciated that the present invention is one which meets the goal of providing a complete management tool for the operators of the establishment in which the surveillance system is placed. By using the timed relationship between switch closures, and the sequential relationship between switch closures to define alarm events, activities of employees which are unacceptable will be monitored and recorded, without recording an undue number of normal transactions. Furthermore, as employees become properly trained, and develop habits of quickly opening and closing the cash drawer during a transaction, the probability of properly recording an alarm event triggered by the cash drawer staying open too long, and thus obtaining video tape of a theft, is increased. This is because the user can lower the programmable maximum drawer open time, referred to above, as employee habits improve. This is particularly true when the video display fed to the recorder is controlled by the above-mentioned multiplexer.

That the present invention meets these and other objects of the invention, and provides an improved surveillance system, will be appreciated from the detailed description of the preferred embodiment below.

BRIEF DESCRIPTION OF THE PREFERRED EMBODIMENT

FIG. 3, consisting of FIGS. 3A and 3B, show two alternate video display formats used in the preferred embodiment.

FIG. 4 is a plan view showing the novel switch mat apparatus used in the preferred embodiment.

FIG. 5 is a cross sectional view of the internal structure of an embodiment of the switch arrays of the mat of FIG. 4.

Figure 6:
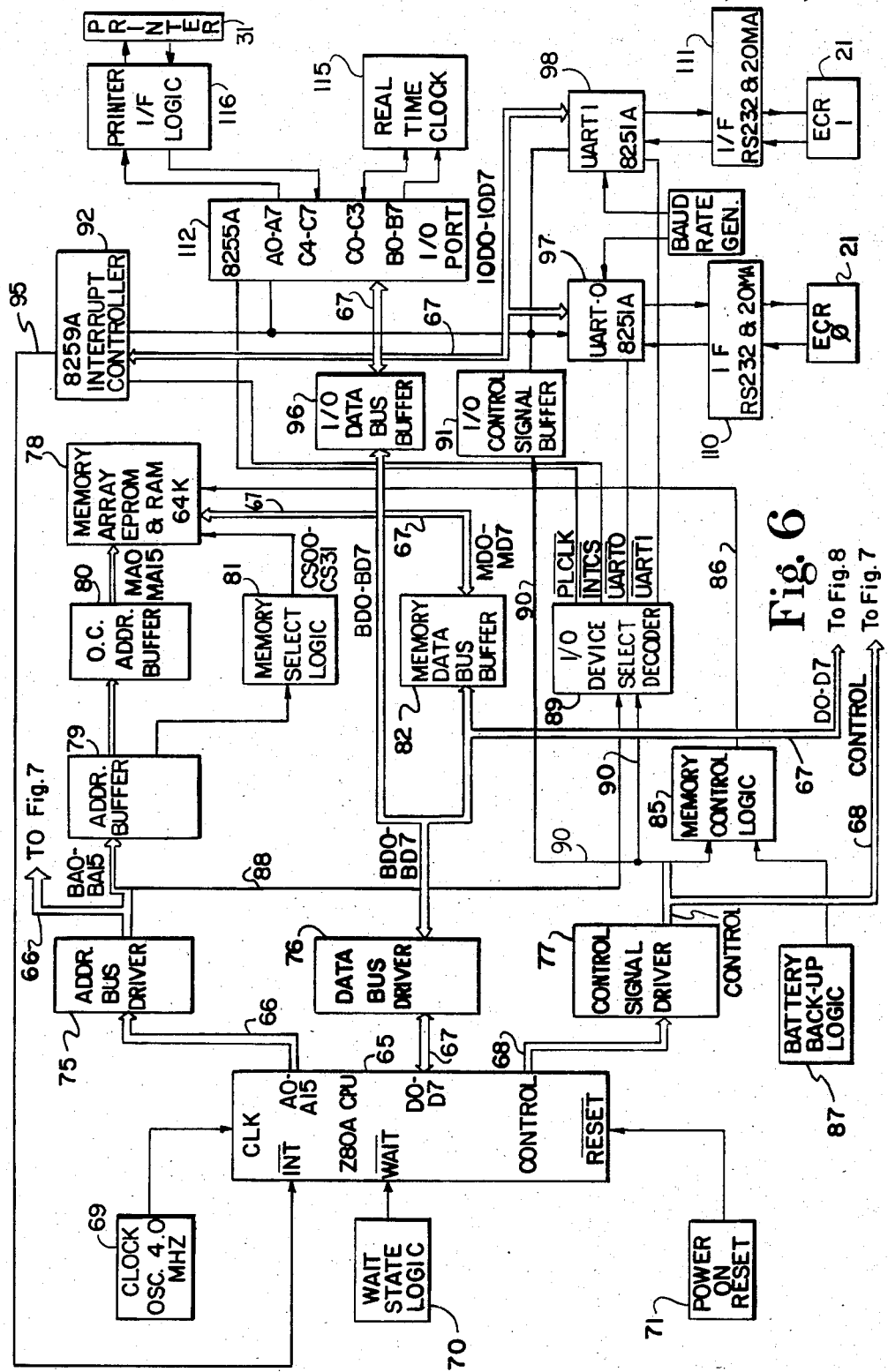

FIG. 6 is a block diagram of the central processing unit and peripheral interfaces of the preferred embodiment.

Figure 7A:
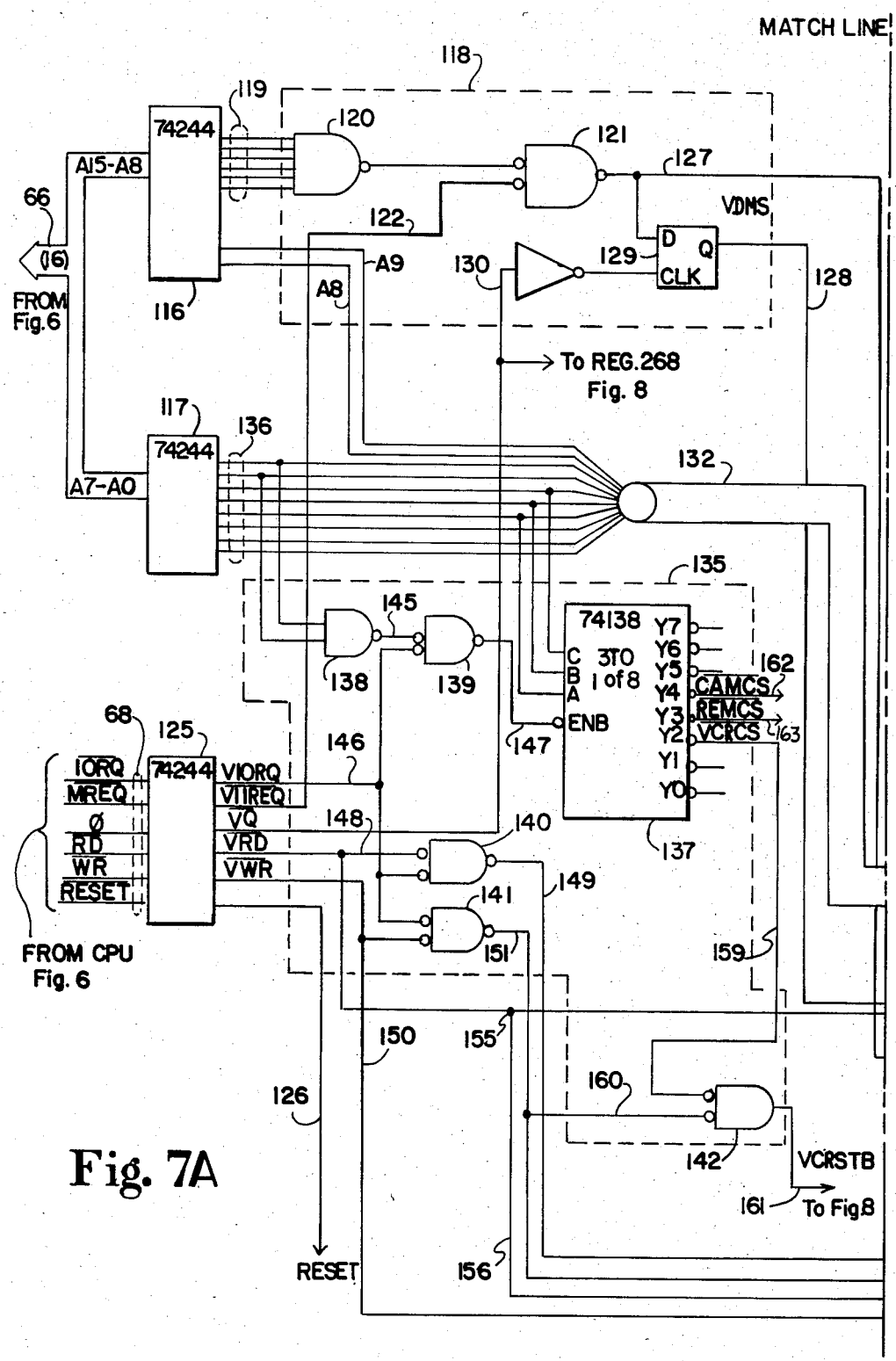
Figure 7B:
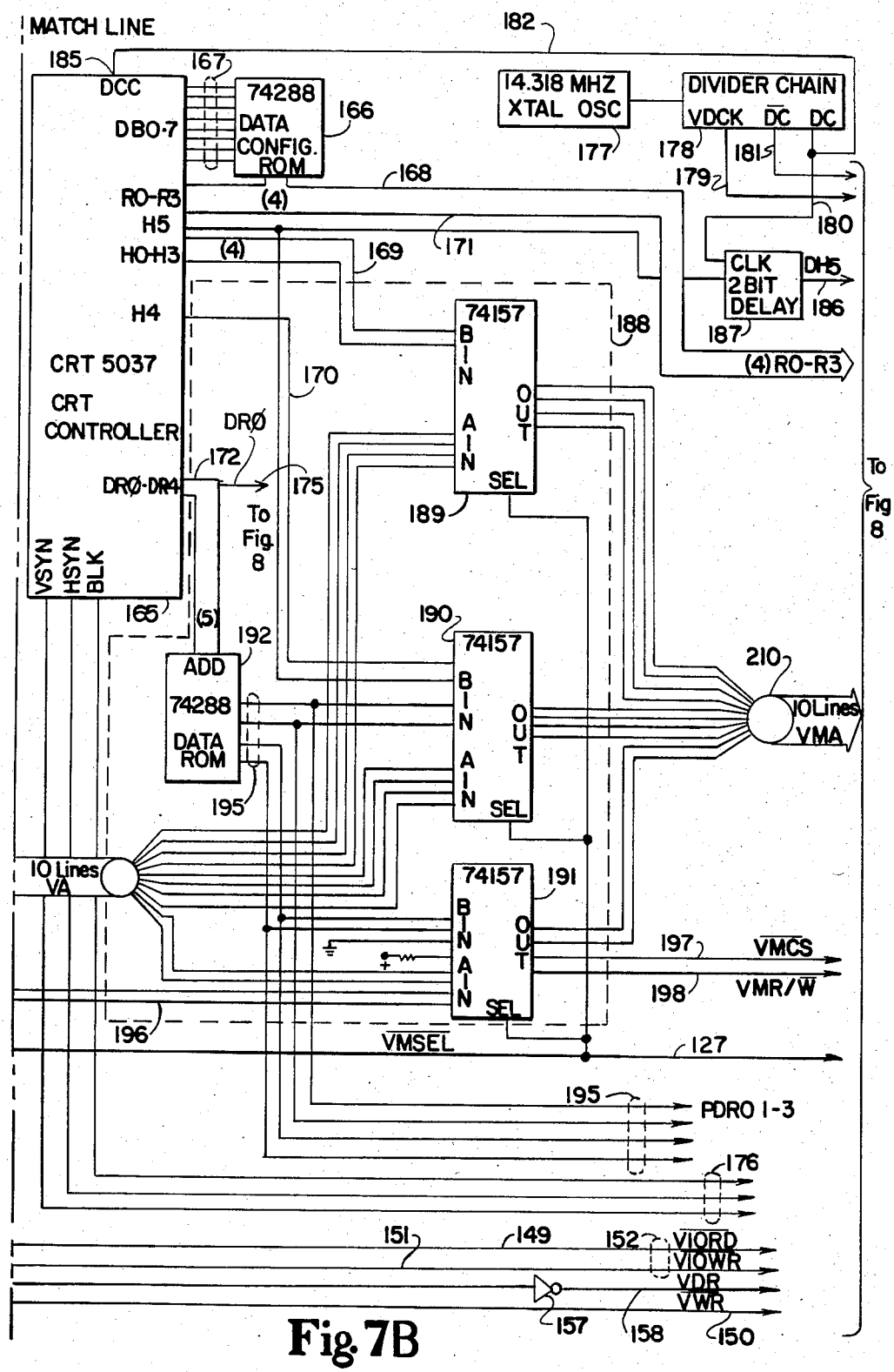

FIG. 7, consisting of FIGS. 7A and 7B is a schematic diagram of a portion of the video board of the preferred embodiment including the CRT controller and input/output device decoders.

Figure 8A:
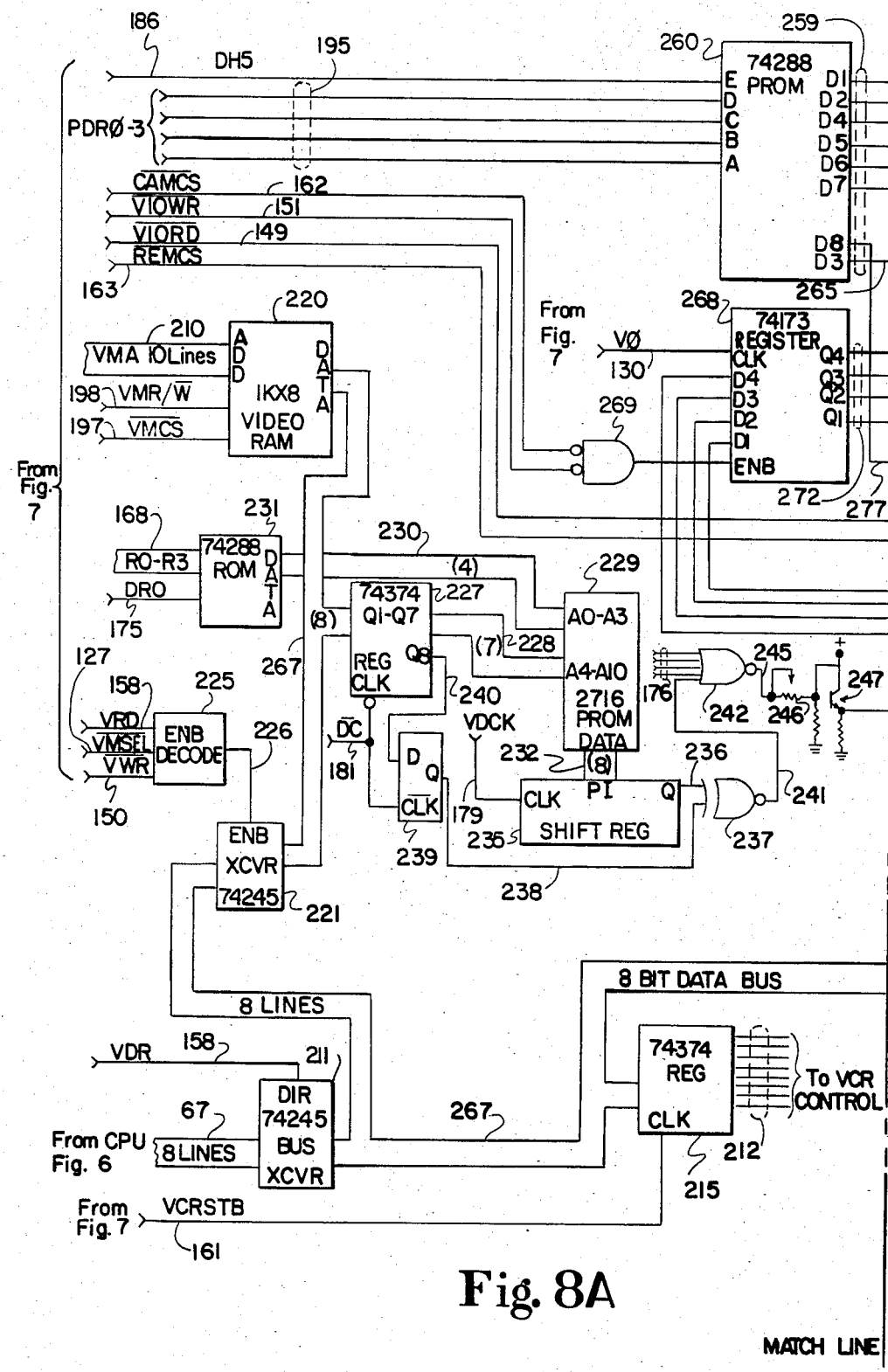
Figure 8B:
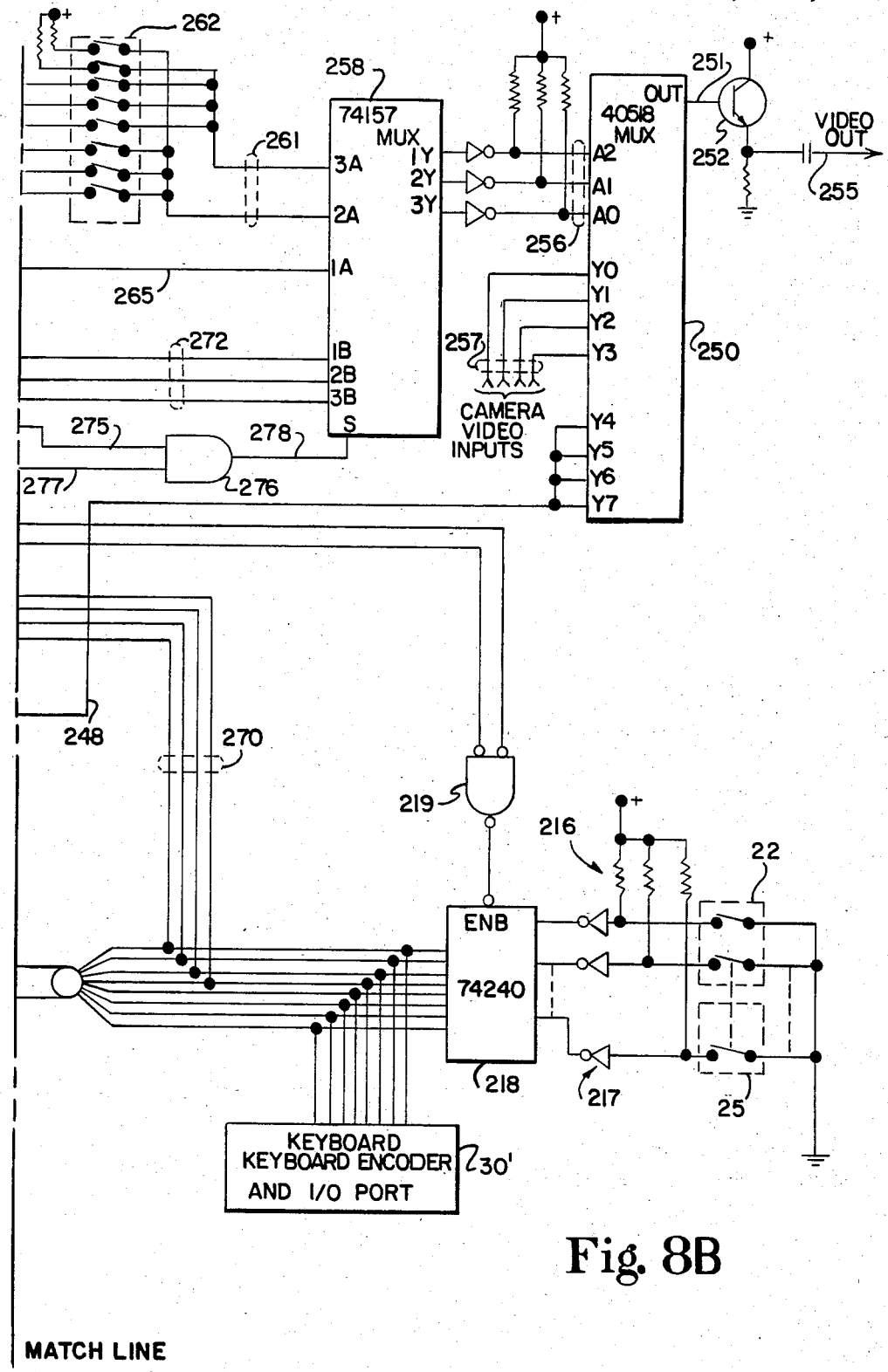

FIG. 8, consisting of FIGS. 8A and 8B is a schematic diagram of a second portion of the video board of the preferred embodiment including the video memory, video signal multiplexer, and the sensing switches of the preferred embodiment.

Figure 9:
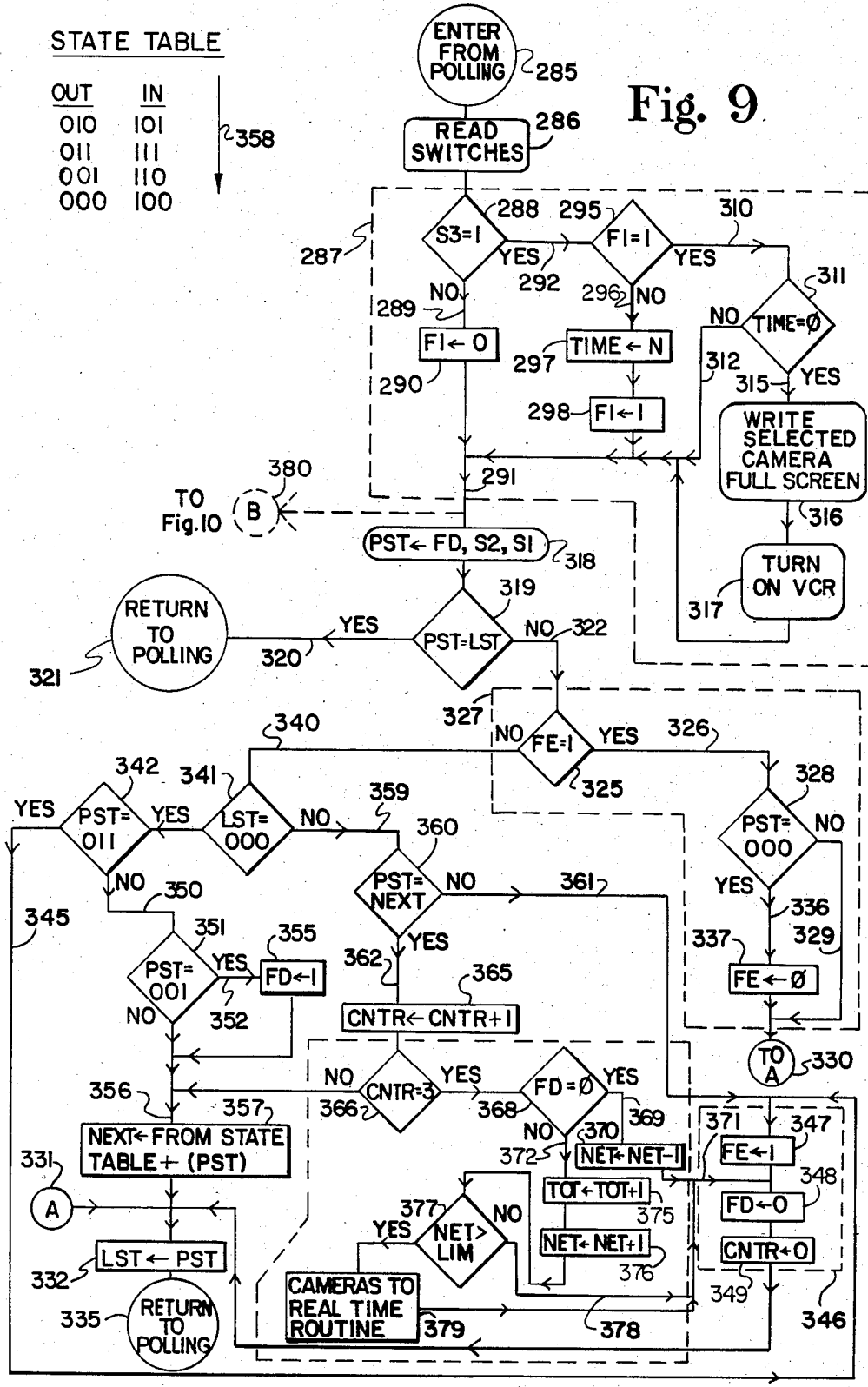

FIG. 9 is a flow diagram for the commands controlling the central processor to implement certain of the novel features of the present invention.

Figure 10:
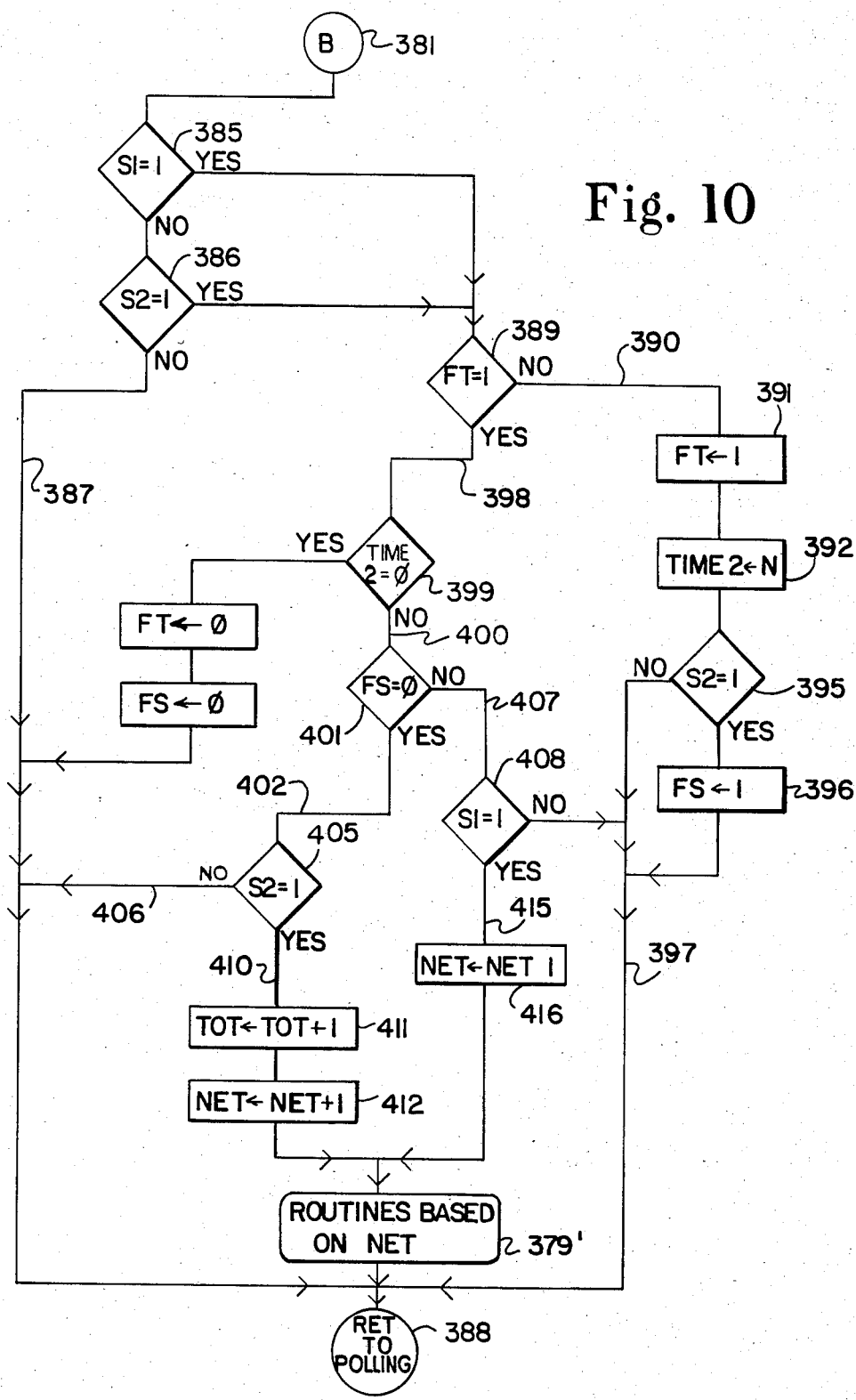

FIG. 10 is a flow diagram for the commands controlling the central processor to implement an alternative routine for a portion of FIG. 9.

DETAILED DESCRIPTION

The preferred embodiment will now be described with reference being made to the accompanying drawing figures. As noted above, the present invention is one which provides an improved video surveillance apparatus. The preferred embodiment is one specifically designed to be used in small retail establishments, such as convenience stores, but the invention embodied in the preferred embodiment has wider application.

Figure 1:
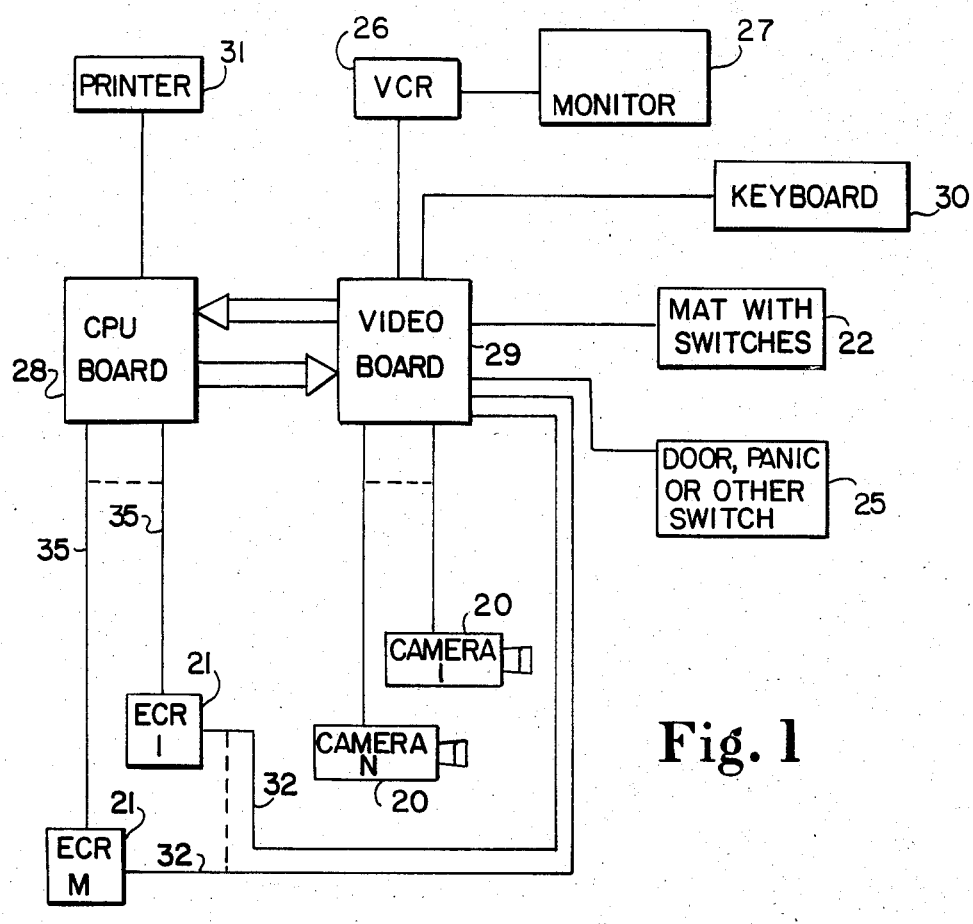
FIG. 1 is a block diagram of the preferred embodiment.

The system as shown in FIG. 1 includes N video cameras 20 for monitoring activities within the monitored location at which the system resides. The preferred embodiment is designed to be connected to M electronic cash registers (ECRs) 21.

In addition to the video monitoring accomplished by cameras 20, a novel mat including a pair of planar switch arrays is included, and is shown as 22 in FIG. 1. Additionally, other switches shown collectively as 25 are provided for both monitoring and control purposes. Video and textual information is recorded both in memory and on a video tape recorder (VCR 26). Output from the VCR and the cameras 20 is displayed on monitor 27.

In the preferred embodiment, the electronics controlling and operating the system are provided on two circuit boards, CPU board 28 and video board 29. It will be understood by those skilled in the art that the distinction is only for purposes of describing the preferred embodiment and is not in and of itself, limiting of the scope of the present invention. Indeed, as will become apparent from the description below, the division of functions between CPU board 28 and video board 29 is made in part for assuring relative ease of using expanded video boards with the same CPU board to construct other embodiments of the present invention. Thus, it will be understood that the CPU and video boards are collectively referred to as a controller for the system.

Also connected to the controller is a keyboard 30 from which the operator may enter commands, and select functions to be performed by the preferred embodiment. The preferred embodiment includes a number of software programs for generating reports, controlling the operation of VCR 26 and monitor 27, and the like. Many of the features of the preferred embodiment are user programmable through keyboard 30. When the user of the system desires to generate one or more reports based on information stored in memory, the screen of monitor 27 is used as a conventional monitor screen for a small computer. Thus, monitor 27 is used as both a video signal monitor and as a monitor for displaying menus, reports, and the like, under the control of the user through keyboard 30.

Connected to CPU board 28 is a printer 31. The printer is used to generate reports based on collected data, and also provides real time tracking of events of particular interest, both those considered normal and abnormal. For example, the printer is used to provide a report upon each occurrence of a money drop into a secured vault area made by a cashier. Information on the printer will include the time of day that the drop occurred, and also provide an indication of the total amount of money that should have been present in a cash drawer just prior to the making of the drop. This information is available because the program controlling the central processor on board 28 includes steps which maintain track of total amount of money in each cash drawer, based on all the transactions from ECRs 21.

The preferred embodiment disclosed herein is one in which M, the number of ECRs, is 2 and N, the number of cameras, is four. As noted above, this arrangement is particularly suited for a small convenience store but is not limiting of the scope of the present invention. Thus, the example of an environment for the preferred embodiment used herein is referred to as a store which should be understood to generically include any monitored location at which an embodiment of the present invention is situated.

Lines 32 going from ECRs 21 to video board 25 are representative of cash drawer switches for each of the electronic cash registers. As is known to those skilled in the art, such switches are used to give an indication of whether the cash drawer associated with each register is open or closed.

Alternately, information concerning the state of the cash drawer can be provided over data links 35 connecting ECRs 21 to the CPU board 28. In the preferred embodiment shown herein, information concerning each cash register transaction is provided over data links 35 and lines 32 carry information concerning the state of the cash drawer switches separately to video board 29. However, either alternative may be used, and it is only important that information concerning the state of the cash drawer switch be provided to the controller in constructing embodiments to the present invention.

Figure 2:
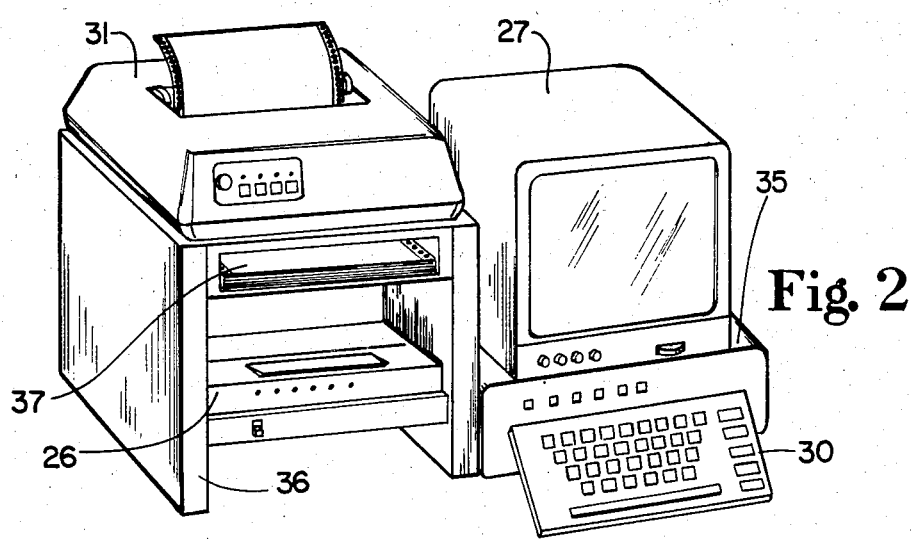
FIG. 2 is a pictorial diagram of the apparatus at a control center for the preferred embodiment.

Turning next to FIG. 2, a pictorial diagram of the central monitoring location of the present invention is shown. It may be seen that the preferred embodiment is constructed in a very compact manner. Monitor 27 sits atop a box 35 housing the CPU and video boards. Attached in a hinged fashion to box 35 is keyboard 30 which may be folded up or down. In the preferred embodiment, a locking arrangement is provided so that the keyboard may be locked in a folded up position (not shown) to prevent tampering with the system by unauthorized personnel. VCR 26 is embodied as a relatively inexpensive VHS format video cassette recorder of the type commonly available for use in the home. A frame 36, which is secured to housing 35, provides a platform for printer 31 above VCR 26, and also provides a slot 37 for holding paper for the printer.

Before describing the circuitry for controlling the present invention in detail, some of the results of this control will be explained in connection with FIGS. 3A and 3B. FIG. 3A shows a typical normal display format on monitor 27 for the preferred embodiment. The screen is divided into four quadrants shown as 38-41. This arrangement allows some of the output of each of cameras 20 to be viewed at all times, either in real time, or images stored on video cassette recorder 26. This description of the preferred embodiment includes a description of the way the system reacts to a number of different possible "alarm events". Each alarm event is one, defined by the user of the system, which is considered out of the ordinary, or particularly worthy of scrutiny for some other reason. It should be understood that when no alarm events have occurred, the system is configured to operate as an otherwise conventional video recording surveillance system having a time lapse mode of operation. Thus, video recorder 26 will be periodically turned on for a predetermined period of time in the absence of the occurrence of alarm events which cause it to turn on as described hereinbelow.

Furthermore, it should be understood that all textual information of which it is desired to keep a video record is displayed on a lower portion of the screen, shown as 42, in FIG. 3A. As will become apparent from the detailed description of the video board in connection with FIGS. 7 and 8, this information is generated by the controller of the present system and recorded in a video format. Thus, no use is made of the conventionally provided audio track on the video tape within the VCR and audio information is recorded thereon while the VCR is in a record mode. Some prior art systems have devoted the audio track of a video cassette recorder to the storage of data to be displayed in a fashion similar to that shown in segment 42 of the screen of monitor 27.

As shown, by way of example, in FIG. 3A, one of the cameras, which is providing the display for quadrant 38, is directed at ECR 21. While the contents of the pictures in remaining quadrants 39-41 are not shown in detail, a typical arrangement might be to have one of the quadrants displaying a signal from a camera showing a rear door to the store, and two other cameras showing shelves containing merchandise, particularly those which are difficult to view from the cashier's check-out counter.

As was noted in the summary of the invention above (and will be described in detail below), the present invention includes a video multiplexing arrangement so that each of quadrants 38-41 on monitor 27 constitute approximately one-fourth of the total field of view of a camera generating the picture. By adopting this arrangement, no compression is required to get the split screen format shown in FIG. 3A, and indeed, the signals need only be multiplexed under the synchronous control of the CRT controller providing horizontal and vertical synchronization signals to both monitor 27 and cameras 20.

Viewing FIGS. 3A and 3B in conjunction with each other, one advantage of this arrangement can be appreciated. FIG. 3B shows a full screen display from the particular camera which is providing the image for quadrant 38 in FIG. 3A. This particular camera (not shown) is normally trained on cash register 21 and thus cash register 21 is a monitored device. Since quadrant 38 of the split screen format (FIG. 3A) corresponds to one quadrant of the full field of view of a particular camera (also shown as 38 in FIG. 3B), it will be appreciated that advantageous selection of the fields of view for the cameras can be made.

FIG. 3B shows the full screen display when an alarm event triggered by an occurrence near the ECR has taken place. For example, the cashier may have depressed a panic button indicating that some form of emergency (usually a robbery) is occurring. Alternately, a cash drawer opened too long type alarm event may have occurred which caused the controller to go to a full screen display of the picture from the particular camera trained on ECR 21. As is illustrated in FIG. 3B, proper selection of the field of view for each camera, including the portion of the field of view which will normally be displayed in the split screen format, can be used to provide a recording arrangement which is an improvement over the prior art. The full field of view of the particular camera in question can be selected to include door 45 which is the entrance and exit door for the convenience store in which the preferred embodiment resides. Thus, when an alarm event associated with the monitored device 21 occurs, the full screen display shown on FIG. 3B will be both recorded and displayed on monitor 27.

If an advantageous field of view has been selected for this particular camera, important activities may be recorded which would not have been had the split screen format been displaying the entire field of view for the camera. Since alarm events in the nature of a robbery are of particular concern in convenience stores, the ability to have a full screen display of the entire path between ECR 21 and door 45 greatly increases the probability that a visual image of a thief will be recorded in response to the alarm event. Of course, if the full field of view of this camera were normally displayed in the split screen format, images of the cash register would be much smaller.

Thus, the present invention is one which provides a change of state of a video signal multiplexer to provide a change in video display format displayed and recorded in response to the occurrence of an alarm event.

THE SWITCH MAT OF THE PREFERRED EMBODIMENT

Turning next to FIGS. 4 and 5 the novel switch mat used with the preferred embodiment is shown. FIG. 4 is a plan view showing the areas containing each of a pair of planar switch arrays. Mat 22 is divided into three areas: areas 46 and 47, each of which contains a planar switch array, and area 48 which contains no switches.

Each of the switch arrays in areas 46 and 47 are designed to provide a switch closure signal to the controller of the present invention when persons step on the respective areas. Area 48 separates the two so that a distinction may be made between closures in area 46 and closures in area 47.

Arrow 49 shown in FIG. 4 is provided to give a definition of direction in examples of the operation of mat 22 which are described in connection with FIGS. 9 and 10. Thus, for purposes of this example, arrow 49 points in a direction leading from outside the store to inside the store. It should be understood that this directional definition is only for purposes of providing a reference for the example disclosed herein, and is not to be considered limiting of the present invention.

The inventors of the present invention have empirically determined that distance D1, the width of areas 46 and 47 should be between sixteen and twenty inches. Distance D2, the width of area 48 which does not contain a switch array, should be approximately five to six inches.

The purpose of providing a pair of planar switch arrays in two distinct areas, 46 and 47, is to provide areas of mat 22 which will detect distinct footfalls of persons walking across the mat. Thus, the apparatus of the present invention can sense the direction in which a person walking across mat 22 is traveling. As noted above, prior art surveillance systems which attempt to keep track of the number of persons entering or exiting the store have conventionally used a switch designed to detect the opening and closing of the door through which customers travel. Such arrangements cannot account for the direction in which the person is traveling, nor can they detect an opening of the door which occurs once at a time when several people enter the store while the door is held open. The improved apparatus which is used in conjunction with the switch arrays of mat 22 is described in detail below.

FIG. 5 is a cross sectional view taken along line 5—5' shown in FIG. 4. FIG. 5 shows the structure of the interior of mat 22.

A top layer 50 and a bottom layer 51 are made of any conventional non-conductive wear resistant materials such as plastic. It is of course preferred to have the material for top and bottom coverings 50 and 51 to be water and dirt resistant. Two conductive membranes shown as 52 and 52' are each disposed in the interior of the mat structure between surfaces 50 and 51, and are separated by a perforated compressible material shown as 55. Exemplary perforations 56 are illustrated in FIG. 5.

The preferred embodiment of perforated compressible material 55 is a layer of foam rubber having a plurality of holes 56 passing therethrough. The spacing of holes 56 is such that conductive membranes 52 and 52' will make contact at several points under the pressure of a person's foot stepping on the mat. When material 55 compresses, the membranes 52 will touch in one or more places causing a switch closure to be detected at a pair of conductors (not shown) connected to conducting membranes 52 and 55. Thus, it will be appreciated that a two-wire pair is attached to each of conductors 52 and 52' for each of sections 46 and 47 of mat 22 (FIG. 4) and that this arrangement will constitute a planar switch array for detecting the presence of a person or object on the switch array.

It should further be appreciated that arrow 49 further defines a travel direction which is contemplated by the structure of the mat. In this sense, it does not matter whether arrow 49 is considered to have a directional sense of either up or down as shown in FIG. 4 but rather that arrow 49 defines an axis along which sections 46 and 47 are spaced apart, and separated by area 48. It is believed that mat 22 and the structure shown therefor, is in and of itself, novel.

THE CPU BOARD

The CPU board of the controller of the preferred embodiment will now be described. A block diagram of the CPU board is shown in FIG. 6. The central processing unit for the preferred embodiment is a Z80A microprocessor chip 65 currently manufactured by Zilog Corporation of Cupertino, Calif., and others. The characteristics, instruction set, and architecture if the Z80 CPU are well known to those skilled in the art and, except where necessary to understand the rest of the preferred embodiment, will not be discussed in detail.

As known to those skilled in the art, the Z80 includes a 16-bit address bus 66, and 8-bit data bus 67 and a control bus 68. The preferred embodiment is clocked by a 4-megahertz crystal oscillator 69. Wait state logic 70 and power on reset logic 71 are conventional implementations of functions for a microprocessor controlled system, and will not be described in detail. Suffice it to say that wait state logic 70 activates the wait input of the Z80 when the CPU is communicating with relatively slow peripheral devices.

The three aforementioned buses for microprocessor 65 are provided to bus drivers 75-77. These devices provide sufficient power to drive a plurality of inputs to which the buses are connected. As is shown near the top of FIG. 6, a tap to address bus 66 extends to FIG. 7. Similarly, a tap of control bus 68 goes to FIG. 7 and data bus 67 is provided to the circuitry shown on FIG. 8.

The CPU board includes memory array 78. Address bus 66 is provided through an additional buffering stage, shown as 79, through an opcode address buffer, shown as 80, to memory array 78. Memory array 78 is memory mapped. Conventional decoding logic for addressing particular locations in array 78 is shown as 81 in FIG. 6.

As shown on FIG. 6, memory array 78 includes electrically programmable read only memories and random access memory. It should be understood that coded instructions for microprocessor 65 reside in the read only memory portion of array 78 and embody the logic of the flow chart shown in FIGS. 9 and 10, as well as providing instructions to execute other functions of the preferred embodiment described herein.

Naturally, a tap to data bus 67 is provided to memory array 78 through a bidirectional data bus buffer 82. Control bus 68 for the Z80 processor drives a conventional memory control logic circuit, shown as 85, which provides control signals along the memory control bus 86 to memory 78. It will be appreciated by those skilled in the art that memory control logic 85 decodes control bus signals indicating fetches from and writing operations to, memory array 78, as well as providing timing signals for reading and writing strobes. Furthermore, the preferred embodiment of the present invention includes dynamic RAMs in the random access memory portion of memory array 78, and memory control logic 85 provides refresh signals to the dynamic RAMs in a conventional manner. The preferred embodiment further uses conventional battery back-up logic 87 to retain the contents of memory array 78 for several days in the event of a power failure on the system normally providing power to the CPU board.

The preferred embodiment implements an address map for processor input/output (I/O) operations which allow data to be read from and written to devices other than memory. This implementation is in keeping with the architectual design of the Z80 microprocessor. As is known to those skilled in the art, control bus 68 from the Z80 includes output lines which will alternately indicate that address bus 66 contains a valid address for a memory read or write operation, or that the lower order 8-bits of address bus 66 contain an address for a peripheral I/O device. Thus, bus 88 extending from address bus 66 to I/O device select decoder 89 should be understood to carry the lowest order 8-bits of the Z80 address bus.

A portion of the control bus appropriate for controlling operations of I/O devices is brought out as 90, and is provided to both the I/O device select decoder 89 and I/O control signal buffer 91. In the preferred embodiment, I/O device select decoder 89 of FIG. 6 merely decodes signals intended for the I/O devices on the CPU board shown on FIG. 6, and a similar decoder, described hereinbelow, decodes signals intended for I/O devices on the video board.

In the preferred embodiment, the CPU board contains four I/O devices. The first of these is type 8259A interrupt controller shown as 92 on FIG. 6. The output from interrupt controller 92 is provided on line 95 back to the interrupt input of microprocessor 65.

In the preferred embodiment, interrupt controller 92 operates only in a polling mode, although it will be apparent to those skilled in the art that additional I/O devices could be connected to the interrupt controller, and advantage could be taken of the vectored interrupt capability of the Z80 processor. Data bus 67 receives additional buffering by buffer 96 prior to being extended to the I/O devices shown in FIG. 6.

As noted above, the preferred embodiment is one which provides for connection of two electronic cash registers 21 to the CPU board. These are interconnected through a pair of universal asynchronous receiver/transmitters (UARTs). Each of UARTs 97 and 98 is connected to ECRs 21 through interfaces 110 and 111. It will be understood by those skilled in the art that interfaces 110 and 111 are constructed and arranged to provide data from ECRs 21 to UARTs 97 and 98 so that ASCII and BCD encoded data may be written into the transmit register of UARTs 97 and 98 and provided to CPU 65. There are a number of conventional methods of interfacing cash registers and UARTs, and the details thereof will not be described herein. However, in the preferred embodiment, it is preferable that a novel universal electronic cash register interface of the type shown in co-pending application Ser. No. 628,343, filed July 6, 1984, entitled "Intelligent Interface for Electronic Cash Register", which is assigned to the assignee of the present invention, be used.

A type 8255 input/output port 112 is also controlled by I/O device decoder 89. Two devices, printer 31 and real time clock 115, are connected to microprocessor 65 through I/O port 112. Conventional printer interface logic, shown as 116, is provided between the printer and the I/O port.

Real time clock 115 is a battery backed up type MSM 5832 real time clock/calendar which, as is known to those skilled in the art, is a CMOS device providing data indicative of time of day (hours, minutes, seconds) as well as date, day of the week, month and year. This device is used to record the time of occurrence of the events for which information is stored in memory array 78.

As noted above, the fact that certain of the I/O devices are included on the CPU board of FIG. 6, and others are included on the video board of FIGS. 7 and 8, is merely a matter of design choice and one which allows for modification and expansion of the preferred embodiment.

DEVICES ON THE VIDEO BOARD

A detailed schematic of the portions of the video board of the preferred embodiment which are pertinent to the invention disclosed herein, are shown on FIGS. 7 and 8. Turning first to FIG. 7, the portion of the video board which includes the video board I/O and memory decoder, the CRT controller for monitor 27 (FIGS. 1 and 3) and video memory address multiplexing apparatus, is shown. Beginning at the lefthand side of FIG. 7, the tap from address bus 66 is connected to the video board. The address lines from bus 66 are provided to a pair of type 74244 buffer chips shown as 116 and 117.

In this specification, references to standard TTL devices should be understood to refer to their low power Schottky type equivalents. The present disclosure refers to the standard TTL numbers for these devices, which are well known to those skilled in the art, and omits the common designation "LS" included in such numbering to indicate that a low power Schottky version is what is actually used.

The video board memory address decoder is shown enclosed within dashed line 118. The highest order six bits from address bus 66, as shown within dashed line 119, are provided as inputs to NAND gate 120. The output of NAND gate 120 is one input to OR gate 121. The other input to OR gate 121 is the negated memory request signal from control bus 68 which appears on line 122.

As is also noted on FIG. 7, control bus 68 is provided to the video board. It passes through a type 74244 buffer 125 to provide a buffered tap from the control bus to the video board. As shown on FIG. 6, the names given each line on bus 68 are those specified as a standard pin names for the Z80 microprocessor 68 (FIG. 6). On the output side of buffer 125, each line of the control bus is given a name formed by taking the standard name for the line in the Z80 nomenclature, and inserting the letter V before the standard name. This is to indicate that this particular line is a tap from the bus brought to the video board, but it should be understood that the functions are identical to the corresponding line from the Z80 control bus. It should further be understood that, in this specification, the mnemonics given to signal lines will be referred to irrespective of whether the signal represented by the mnemonic appears in asserted or negated form. Particular reference will be made to the asserted or negated form only when necessary to understand the particular point under discussion. Otherwise, such constant reference to whether these signals appear in asserted or negated form is not necessary for a thorough understanding of operation of the preferred embodiment by those skilled in the art.

Reset line 126 from the output of buffer 125 is connected to appropriate reset inputs and inputs for triggering reset logic on a plurality of devices on the video board. The forcing of devices to initial states in response to a reset output from a microprocessor is a function well known to those skilled in the art and the particular implementation is not shown in the drawings.

Continuing with the discussion of video memory decoder 118, the signal appearing on the output of OR gate 121 on line 127 is given the mnemonic VMSEL indicating that it is a signal corresponding to the selection of video memory. A delayed version of this signal appears on line 128, being delayed by D flip-flop 129, which is clocked by the single phase system clock signal appearing on line 130 from control bus 68.

Thus, it will be appreciated that the video memory select line 127 goes low (which is its active state) in response to an address appearing on address bus 66 for which the six highest order bits are one, and the concurrent presence of a memory request signal from microprocess 65. Thus, it will be appreciated that within the memory map of the preferred embodiment, memory addresses which have a hexadecimal range beginning at FC0D, are located in the video memory.

The ten lowest order of bits of address bus 66 are collected into a 10-bit video address bus shown as 132 on FIG. 6. Thus it will be appreciated that the preferred embodiment can include up to 1K of addressable memory within the video memory.

The I/O device select decoder for the video board is shown within dashed line 135. All lines from control bus 68, except for the reset line, are provided as inputs to decoder 135. As noted above, the eight lower order address lines of address bus 66 contain addresses for I/O devices. These eight lines are shown within dashed line 136 on the output of buffer 117. As may be seen from FIG. 7, lower order address lines A3–A7 are also provided as inputs to video I/O decoder 135. Thus it will be appreciated that the I/O address map for the devices on the video board ignore lowest order address bits A0–A2, and thus state of these lines are irrelevant to selection of I/O devices on the video board.

Decoder 135 comprises a type 74138 three line to one of eight decoder 137, and a plurality of gates 138–142. The two inputs to NAND gate 138 are address lines A6 and A7. The output of this gate appears on line 145 as an input to OR gate 139. The other input to gate 139 is the I/O request signal from line 146. The output from gate 139 appears on line 147 as the enable input to three line to one of eight decoder 137. Thus it will be appreciated that the devices activated by decoder 135 are ones which lie in the I/O address space for which lines A6 and A7 are equal to one. The I/O request signal from line 146 and the read signal from line 148 are logically ANDed together by OR gate 140, the output appearing on line 149 as an I/O read signal for the video board (VIORD).

Similarly, the write signal (VWR) from line 150 and the I/O request signal from line 146 are logically ANDed by OR gate 141, the output of which appears on line 151 as a video write signal (VIOWR). Thus, the two line pair shown as 152 comprises the video read and write signal lines for I/O devices associated with the video board. The read signal from line 148 is provided to line 156, where it is inverted by inverter 157 to provide an asserted form of the read signal (VDR) on line 158.

Since decoder chip 137 is enabled when address lines A6 and A7 are equal to one, and address lines A0–A2 are irrelevant to its operation, it will be appreciated that the particular output from the decoder chip which is active will be determined by address lines A3–A5. These can be ascertained by inspection of the connections from the lower portion of the address bus 136 to the decoder 137, and the outputs shown for the decoder chip. Output Y2 (shown as VCRCS) appears on line 159. From inspection of the drawing it will be appreciated that this line is active when address lines A5–A3 are equal to 010. The video write signal from line 151 is provided to line 160 as one input to NOR gate 142. The output of gate 142 appears on line 161 with the mnemonic VCRSTB, to suggest VCR strobe. Indeed, this line becomes active when an output word is provided on the data bus which corresponds to an operational command to the video cassette recorder. Two additional outputs are brought out from decoder 135: CAMCS line 162 and REMCS line 163. These controls, in conjunction with the video write control line 151 and the video read control line 149, respectively, control the writing of data into a register controlling the video display format and the reading of the plurality of remote switches, described in detail below. Outputs Y0, Y1, and Y5–Y7 enable other I/O devices (including keyboard 30) in a conventional manner. A detailed showing of these devices and connections is omitted for the sake of clarity.

Next, the operation of the CRT controller and the novel multiplexing arrangement for the video memory will be described. Display monitor 27 (FIG. 1) together with the synchronization signals for cameras 20 (FIG. 1) are provided from a type CRT 5037 CRT controller shown as 165. This type of CRT controller is currently manufactured by Standard Microsystems Corporation and will be familiar to those skilled in the art.

A type 74288 read only memory 166 is attached to 8-bit data bus 167 of CRT controller 165. Data from this ROM is used, in a conventional manner, to configure CRT controller 165 upon a reset of the system. Use of a ROM in this manner is described in detail in information provided by the manufacturer of the type 5037 controller and is not repeated in detail herein. The R0–R3 outputs appear on a 4-bit bus 168 which addresses ROM 166 during a reset and is further provided to circuitry shown on FIG. 8. The R0–R3 lines are the count output from the CRT controller's scan counter. Six of the outputs of the character counter of the CRT controller are also brought out. The four least significant bits, H0–H3, are on a 4-bit bus 169. Character counter output H4 appears on line 170 with output H5 on line 171. The five data row counter outputs DR0–DR4 are brought out on a 5-bit bus 172 with the DR0 line additionally being pulled out on line 175 to be provided to the circuitry of FIG. 8.

The vertical sync, horizontal sync, and blanking outputs used to control the raster of cameras 20 and monitor 27 (FIG. 1) are brought out collectively as three lines 176. Appropriate connections (not shown) of these signals to the scanning circuitry of the cameras and the deflection circuitry of the video monitor are provided in a conventional manner.

The timing signals for the video signal circuits of the preferred embodiment, which include controller 165, the cameras, and the monitor, are derived from a 14.318 megahertz crystal oscillator 177. A plurality of counters and flip-flops forms a conventional divider chain 178. The video clock signal (VDCK) appears on line 179 at the frequency of oscillator 177. Asserted and negated forms of the dot counter carry signal (DC) appear on lines 180 and 181, respectively. The asserted form is provided on line 182 to dot clock carry input 185 of controller 165. The signal on line 182 thus establishes the basic character rate selected for the preferred embodiment while the video dot clock 179 toggles at the dot rate. A delayed version of the H5 signal on line 171 appears on line 186 as signal DH5. The delay is accomplished by a pair of D-type flip-flops shown as 187 on FIG. 7. The time by which signal DH5 is delayed with respect to signal H5 is two clock periods of the character counter clock signal appearing on line 180.

Shown within dashed line 188 is the multiplexing and novel scan programming apparatus of the present invention. An array of twelve two to one multiplexers is formed by the three type 74157 multiplexers 189–191. This apparatus provides an arrangement for allowing the CPU to communicate with devices on the video board, when needed, and alternately to let the video signal path run under the control of CRT controller 165. Since the video signal path is controlled by oscillator 177, it should be noted that timing of signals in the video signal path is controlled (through controller 165) by this oscillator, and is asynchronous to the clock of the CPU board.

The present invention provides an arrangement whereby the conventional timing output signals from CRT controller 165 are modified or programmed, preferably through the use of a read only memory, to provide a variety of possible video display formats. Selection of the particular video display format is made under the control of the CPU simply by writing a particular word, corresponding to the display format to be used, into a register, and then allowing the circuitry associated with the CRT controller to implement the display. By the use of this novel arrangement of selectively modifying the scan timing outputs from CRT controller 165, the central processing unit selects one of a variety of display formats and can implement it with a single write operation to an I/O device on the video board. Thus, central processor time is not wasted in the direct control of the video display formats. However, the central processor responds to appropriate alarm event determinations to cause changes in video display format, such as are shown by example in FIG. 3.

The modification of the scan timing outputs for controlling video display format is performed by read only memory 192. Memory 192 contains thirty-two addressable nibbles of four bits each. As described above, the data row counter outputs are provided on 5-bit bus 172 and sequentially address the contents of ROM 192. The four data output lines are shown collectively as 195 and are provided to four of the B inputs to the multiplexer array 189-191. The other B inputs to the multiplexer consist of the six character counter outputs H0-H5.

The A inputs to the multiplexer array carry the 10-line video address bus 132, the delayed video memory select signal appearing on line 128, and the video read signal which appears on line 196. The delayed memory select signal is shown as the VMCS output on line 197 of multiplexer 191 and the video read signal appears as a video memory read/not write signal denoted as VMR/W on line 198. The remaining ten outputs from multiplexer array 189-191 appear as a 10-bit video memory address bus 210.

From inspection of FIG. 7, the two alternate forms of the signals on video memory address bus 210 and lines 197 and 198 will be apparent. When video memory select line 127 is active, indicating that the CPU is accessing the video memory (which is shown on FIG. 8), the ten line video address bus 132 is connected to ten line video memory address bus 210. Under these circumstances, the delayed video memory select signal from line 128 is connected to line 197 and the video read signal from line 196 is connected to the VMR/W outut on line 198.

When the video memory select line (VMSEL) is inactive, the signals on the B inputs of multiplexers 189-191 are provided to video memory bus 210. Under these conditions the six least significant bits of video memory address bus 210 contain (in corresponding order) the six least significant bits of the character counter output of CRT controller 165. The four most significant bits of video memory address bus 210 carry the signals on line 195, which are the modified signals from the data row counter of controller 165. Thus it will be appreciated that the modified data row output signals from ROM 192 control the four most significant bits of the video memory address bus when the CPU has relinquished control of this bus.

From the foregoing, it should further be appreciated that when the CPU video memory select line 127 is inactive, the address on bus 210 is controlled solely by CRT controller 165. Thus the preferred embodiment is one which provides video memory address control alternately under the control of a CPU and a CRT controller which is clocked in a manner asynchronous to the CPU. It should be further noted that the outputs on lines 197 and 198 are, respectively, logical zero and logical one when the CRT controller is controlling bus 210. Under these circumstances, the video memory (shown on FIG. 8) will be activated and the VMR/W signal on line 198 will be high, indicating that read operations are to take place. As will become apparent from the description of FIG. 8 to follow, the video memory shown thereon is in a read only condition when CRT controller 165 controls bus 210, and that writing into this memory takes place under CPU control.

VIDEO MULTIPLEXER, VIDEO MEMORY, SWITCH READING AND VCR CONTROL

FIG. 8 shows circuitry for controlling VCR 26, reading switches 22 and 25, and the video multiplexer and memory circuits. At the lefthand side of FIG. 8, the signals from the circuitry shown in FIGS. 6 and 7 are identified with the mnemonics discussed above and the same reference numerals which appear on FIGS. 6 and 7. Turning first to the VCR control arrangement, the data bus 67 from the CPU board shown in FIG. 6 is provided to a type 74245 bus transceiver 211. The video read signal 158 controls the direction of data transfer through bus transceiver 211 in a conventional manner.

When a change in the control signal to VCR 26 is required, microprocessor 65 (FIG. 6) executes a write operation providing the I/O address for the VCR. This activates line 159 (FIG. 6) and provides an active output signal for the VCR strobe (VCRSTB) 161 as described in connection with FIG. 7. The VCR strobe line 161 clocks a type 74374 register, the outputs of which are shown as 212. Those outputs are provided to VCR controls. It should thus be apparent that the 8-bit word which appears on data bus 67 is provided to the extension of the data bus shown as 267, and clocked into register 215 to control the operation of VCR 26. Interfacing output lines to the controls of a VCR is well within the skill in the art, and suffice it to say that in the preferred embodiment optocouplers are used. However, many alternate arrangements will be known to those skilled in the art and the interfacing need not be described in detail.

As discussed above, a plurality of switches 22 and 25 are used to detect events within the store at which the present embodiment is located. As shown in FIG. 8, two of the switches are identified as the contacts of the planar switch arrays provided in mat 22 and discussed above in connection with FIGS. 1, 4 and 5. The remaining switches which could include a cash drawer switch, a switch indicating opening and closing of other entrance doors to the store are shown generally as 25.

A conventional set of pull-up resistors 216 is connected to switches 22 and 25 and the state established by this combination is inverted for each switch by one of inverters 217, the outputs of which are provided as inputs to tristate buffer 218. Buffer 218 is connected to data bus 267 under the control of OR gate 219. The output of OR gate 219 becomes active during the concurrent presence of the video I/O read signal on line 149 and the REMCS signal on line 163. These two signals are present when the CPU is executing an I/O read operation (line 149 active) and when decoder 135 (FIG. 7) detects an I/O address indicating that the remote switches are to be read. The state of switches 22 and 25 will then be provided to data bus 267. It is apparent that under these conditions, video read line 158 is in a state which causes bus transceiver 211 to be providing data from bus 267 back to CPU data bus 67. Thus, the CPU regularly polls the state of switches 22 and 25.

Keyboard 30 (FIG. 1) is also connected to data bus 267 through an I/O port having tristate outputs. This connection is done in a conventional manner and all of the elements thereof are indicated as a block 30' on FIG. 8. Thus, no further detailed description of this connection arrangement is necessary.

The video random access memory of the preferred embodiment is shown as memory 220 on FIG. 8. The preferred embodiment uses 1K of 8-bit RAM addressed by video memory address bus 210. RAM 220 serves as the screen memory when monitor 27 is used as a conventional monitor displaying full screens of text, menus and the like described above in connection with FIGS. 1 and 3. RAM 220 also holds data displayed in segment 42 of monitor 20 while video signals are being simultaneously displayed. Segment 42 is illustrated in FIG. 3. An extension of bus 267 is provided to a second type 74245 transceiver 221 which is controlled by a conventional enabling decoder shown as 225. From the fact that the video memory select, video memory write, and video memory read lines are inputs to decoder 225, it will be readily appreciated that the direction control on line 226 is decoded in a conventional fashion to provide for signals passing on data bus 267 in a manner appropriate to the operation being executed by the CPU.

An extension of bus 267' is provided as an input to register 227 and the data input/output lines of RAM 220. Video memory control lines 197 and 198 control the writing of data into video memory 220 at addresses specified by video memory address bus 210 when the CPU is in control of bus 210. This was described above in connection with FIG. 7. From inspection of this portion of FIG. 8, it will be apparent that data is written into video RAM 220, under CPU control, in a conventional manner. CPU 65 (FIG. 6) controls the address at which data is written and the contents of each 8-bit word.

Next assume that appropriate data for display monitor 27 has been written into RAM 220 under the control of the CPU. The CPU then relinquishes control of video memory address bus 210 to CRT controller 165 (FIG. 7).

As noted above, control lines 197 and 198 are then placed in a "read only" state and thus data will be read out of memory 220 under the control of video memory address bus 210. Under these circumstances, transceiver 221 places its outputs in a high impedance state, thus disconnecting this portion of memory from the CPU data bus. When address bus 210 is under control of the CRT controller, video memory address bus 210 carries the character and data row outputs, and thus sequentially cycles through addresses of video RAM 220 providing the data written therein to bus 267'. In the preferred embodiment of the present invention, the data written into RAM 220 under the control of CPU 65 is in ASCII code format. This data appears at the inputs to type 74374 8-bit register 227. As is shown on FIG. 8, the negated form of the character clock (DC) on line 181 clocks register 227 at the character rate. Thus, as data appears on bus 267 from RAM 220, register 227 is loaded each time there is a transition of a particular sense on the character clock line. 7-bit ASCII code is provided from seven of the eight outputs of register 227 on a bus shown as 228. These are provided to the seven highest order address bits of a character generator embodied in a type 2716 programmable read only memory, shown as 229.

The four lowest order address bits to character generator 229 are carried on 4-bit bus 230 from a type 74288 read only memory 231. The address inputs to memory 231 are controlled by scan counter outputs R0-R3 and the least significant bit of the data row counter which appears on line 175. Thus, the use of scan counter outputs for selecting the particular row output for a character generator, such as ROM 229, is provided in a conventional manner, with the exception that the use of ROM 231 allows translation of the scan counter outputs.

The selected row from character generator 229 is read out in parallel on bus 232 and loaded into the stages of a shift register 235, which acts as a parallel to serial converter for the dot row output of character generator 229. As is shown in FIG. 8, the shift register is clocked at the dot rate from line 179 (FIG. 7). The output from the shift register appears on line 236 as an input to exclusive OR gate 237. The other input to gate 237 appears on line 238 from the output of a delay flip-flop 239. The input to delay flip-flop 239 is the Q8 output from register 227. As is shown in the drawing, flip-flop 239 is clocked at the character clock rate derived from line 181.

Since register 227 and flip-flop 239 are clocked synchronously, it will be readily appreciated that the output on line 238, at any given time, is the state of the eighth bit of the word previously loaded into register 227. Since this, together with the dot output from shift register 236 is provided as an input to exclusive OR gate 237, it will be appreciated that the sense of the signal which corresponds to dots in character generator 229 is changed according to the contents of flip-flop 239. Since the output of exclusive OR gate 237, which appears on line 241, actually drives the beam associated with monitor 27, it will be appreciated that flip-flop 239 is used, in a conventional manner, to change the sense of the character display between either black-on-white or white-on-black.

The video dot signal which appears on line 241 is one input to NOR gate 242, the other inputs of which are the blanking and synchronizing signals shown collectively as 176. The output from gate 242 is provided on line 245, through variable resistor 246 to emitter follower amplifier 247. Since line 245 carries the video output, it will readily be appreciated that the logical one on any of lines 176 will cause this output to go low assuring that appropriate blanking signals are provided when blanking and synchronizing outputs from CRT controller 165 are present.

When none of these signals are present, the video dot output from line 241 passes through gate 242 (which inverts it) and on to emitter follower 247. The output of emitter follower 247 is provided on line 248 to the four highest order inputs of video multiplexer 250. The output of video multiplexer 250 appears on line 251. This signal is provided as the input to another emitter follower amplifier built around transistor 252, the output of which is provided to video out line 255. In the preferred embodiment of the present, video out line 255 is connected directly to VCR 26 and monitor 27 is connected to an output from the VCR. This is illustrated in FIG. 1. However, it will readily be appreciated that embodiments of the present invention may be constructed in which the video signal on line 255 is provided directly to a monitor.

It is the control of multiplexer 250 by the remaining circuitry on FIG. 8 which implements the novel video display control of the present invention. As may be seen from FIG. 8, video multiplexer 250 is a CMOS type 4051B, one of eight CMOS multiplexer. The particular one of the Y inputs which is connected to the output on line 251 is controlled by the three multiplexer select lines 256. The four camera video inputs are provided on lines 257. Thus it will be apparent that for addresses 0-3 appearing on lines 256, the individual cameras connected to inputs Y0-Y3 will be selected to provide output to line 251. For addresses 4-7 (select line A2 equal to 1), the dot output from character generator 229, which appears on line 248, will be provided as the video output signal.

In the preferred embodiment of the present invention, the select lines 256 of video multiplexer 250 are in turn controlled by a digital multiplexer 258 preferably embodied as a type 74157 device. The A inputs to multiplexer 258 are driven by the data outputs of a type 74288 programmable read only memory, which are shown collectively as 259. All of outputs 259, except for D3 and D8, can be selectively connected to the 2A or 3A inputs 261 through six of the eight display format selector switches 262. As may be seen from inspection of FIG. 8, the top two switches may be selectively closed to force either or both of inputs 261 to their high state, irrespective of the state of outputs 259 from PROM 260.

Examining the input and output connections of multiplexers 258 and 250, it will be readily appreciated that if both of the top two switches of switch array 262 are closed, inputs 2A and 3A to mux 258 will be held in their logical one state. This provides logical ones on outputs 2Y and 3Y of mux 258, thus assuring zeros on the A0 and A1 select lines of mux 250. Under these circumstances (assuming for the moment that the A inputs from mux 258 control select lines 256), only a change of state on output D3 appearing on line 265 will change the states of select lines 256. Since line 265 will be connected to the 1Y output of mux 258, which in turn is connected to the most significant (A2) one of select lines 256, it will be apparent that a change of state on line 265 will simply switch the output of video mux 250 back and forth between the camera connected to the Y0 input of mux 250, and the video dot information on line 248.

From the foregoing it will be appreciated that other configurations for selecting video outputs from the cameras connected to lines 257 can be implemented with switches 262. For example, closure of the appropriate one of switches 252 to force the 3A input of mux 258 to its logical one state assures that select line A0 of mux 250 is held low. Thus, state changes on the 1A and 2A inputs to mux 258 can cause the video multiplexer to ultimately provide signals from either camera zero (000 on lines 256), camera 2 (010), or the video dot information from line 248 (1×0).

The remaining six switches of array 262 are used to selectively connect the outputs from PROM 260 to the two most significant select lines 261 of mux 258. From the foregoing it should be apparent that (again assuming the A inputs of mux 258 are selected) data written into PROM 260 is selected such that the D3 output on line 265 controls switching between camera inputs and video dot inputs. The balance of the data contained in PROM 260 controls the screen display format for the camera video signals, such as the example shown in FIG. 3.

The address inputs to PROM 260 are the programmed data row counter outputs on bus 195, and the delayed H5 output from line 186 (FIG. 7). Thus, the control of full screen or split screen video displays, through the action of video multiplexer 250, is performed under the control of the modified data row outputs which address ROM 260. Read only memory 260 has contents selected which, together with specific states of switches 262, control the multiplexing of the video signals from the cameras (lines 257) in any desired fashion.

Since the PDR lines 195 are synchronous with the timing signals from CRT controller 165, the selection of portions of the video signals from complete field outputs from cameras 20 is controlled in synchronism with the raster of monitor 27. From the foregoing it will be appreciated that only a portion of the field of view of each camera, as described in connection with FIG. 3, is provided on video output 255 when the multiplexer is alternately selecting signals from more than one camera.

As noted above, the present invention responds to a number of alarm conditions by selecting a particular camera to be displayed full screen: both on the monitor, and to have the full screen image recorded on the video tape recorder. Thus, under these conditions, the video output on line 255 will be devoted to one particular camera plus the textual data appearing in screen segment 42 (FIG. 3).

Since it is CPU 65 which ultimately determines when an alarm condition has been generated, it is apparent that the switching from split screen to full screen video display format must take place under CPU control. This is accomplished through the use of register 268. Register 268 is enabled by NOR gate 269, the inputs to which are the camera strobe output from line 162 and video I/O write output on line 151. From the description of the outputs in connection decoder 135 (FIG. 7), it will be apparent that these lines both become active, thus enabling register 268, when the CPU is performing a I/O write operation and the I/O address is decoded as the CAMCS signal. Register 268 is clocked by the single phase system clock from the CPU which is brought from line 130 (FIG. 7).

The four most significant bits from data bus 267 are brought out as a nibble on four lines 270. Thus, when the CPU desires to write a signal to register 268 indicating that the CPU is to take over control of the camera whose video signal is to be displayed, control lines 151 and 162 are placed in their active state, and a 4-bit data word on lines 270 is clocked into register 268. Three bits of this nibble appear at outputs Q2–Q4 of register 268 and are provided on lines 272 to the B inputs of multiplexer 258. The Q1 output from register 268 is provided on line 275 as one input to AND gate 276. The other input to AND gate 276 is provided on line 277 from the most significant data bit output of ROM 260. The output from gate 276 is provided on line 278 to the select input of mux 258.

When both inputs to gate 276 are one, the B inputs to mux 258 will be provided to its outputs, and thus lines 272 will control select lines 256 of video multiplexer 250. Thus, another aspect of the nature of the data in ROM 260 and the control words written into register 268 becomes apparent. As explained above, video signal selection by multiplexer 250 is controlled by CRT controller 165 (FIG. 7) when the A inputs of multiplexer 258 are provided to select inputs 256. This may be considered the normal or free running state of the multiplexer during which the video display format for the camera signals, as well as the generation of the textual data at the bottom of the screen, is controlled by PROM 260 and switches 262. PROM 260 and switches 262 respond to the translated forms of the data row counter outputs from a CRT controller 165. Thus, to implement these normal conditions, CPU 65 (FIG. 6) will have written a word into register 268 which provides a zero at the Q1 output of the register. This zero appears on line 275 holding line 278 low, assuring that the A inputs of mux 258 control the select lines 256 of multiplexer 250.

When the CPU detects an alarm condition for which the display of a single one of the cameras should be made full screen, the 4-bit word written into register 268 includes a logical one at the Q1 position, and a 3-bit word appears on lines 272 corresponding to selection of a particular camera. In this particular example, the Q4 output of register 268 will be zero and outputs Q2 and Q3 from the register select one of the four possible cameras. It will be apparent that with the Q4 output of register 268 being a zero, a zero will be provided through the 1Y output of mux 258 to the A2 select line of mux 250. This assures that the remaining two select lines choose one of the four camera video signals.

When the user of the system is operating monitor 27 with full screen text, such as is done when report generation takes place, the word written into register 268 will contain a one at the Q4 position and a one at the Q1 position, thus assuring that the video dot signal on line 248 is provided to the video output. Since line 277 from the D8 output bit of PROM 260 must be a logical one for register 268 to control line selection of video mux 250, the value of this bit for each word written into PROM 260 will be readily apparent. Output bit D8 is one for every address of PROM 260 corresponding to data row counts for the majority of the upper portion of the screen of monitor 27. If this is considered in connection with the examples shown on FIGS. 3A and 3B, it will be apparent that during row counts corresponding to all of the raster except the portion 42, line 277 should be held high. This enables register 268 to take control of select inputs 256. Addresses in ROM 260 which correspond to data row counts for the portion of the raster generating screen segment 42 (FIG. 3) will have a logical zero at the D8 bit, thus assuring that PROM 260 controls select inputs 256.

As noted above, the same words will have a logical zero at bit position D3 (which appears on line 265), thus assuring that a logical one appears at select input A2 of video mux 250, selecting the video dot input. Thus, output D8 is a portion of the data contents of PROM 260 which provides an enable signal allowing register 268 (and thus the CPU) to seize control of multiplexer 250. Of course, during full screen displays of text, the word on line 272 will select the video dot signal on line 248 and similarly, this output will be selected when lines 265 and 277 (D3 and D8 of PROM 260) go low. Thus, under these conditions, the video dot output on line 248 is provided for the entire raster. From the foregoing it will be apparent that read only memories 192 (FIG. 7) and 260 provide scan count modification means for controlling the select inputs to video multiplexer 250 and also for enabling the CPU to control video multiplexer 250.

Turning next to FIG. 9, a flow chart of the control logic for controlling CPU 65 to implement the novel features described hereinabove will be described. It should be understood that the flow chart represents the logic of program instructions stored in the read only memory portions of memory array 78 (FIG. 6) described in connection with the CPU board. The logic shown on FIG. 9 is by way of example, and it will be apparent that other schemes of control logic could be adopted to construct embodiments of the present invention.

The conventions adopted with respect to the example shown in FIG. 9 may be understood by first observing FIG. 4. FIG. 4 shows the mat used by the entrance door to a monitored location or stored in which the preferred embodiment resides. Arrow 49 defines the direction a person travels moving from outside the store to the interior of the store. Switch 1 array in segment 46 is thus nearest the outside of the store with switch 2 being nearest the inside.

The dimensions for segments 46, 47 and 48 described in connection with FIG. 4, above, are designed so that most persons normally walking through the door will first close the switch one array, followed by having one foot on each of the arrays, followed by having one foot only on switch array two. Naturally, the next step removes the person from the mat. In naming the variables shown in connection with FIG. 9, variable S1 corresponds to the state of switch one array and variable S2 corresponds to the state of switch two array. A logical one indicates closure of a respective switch. So that the logic of the flow diagrams of FIGS. 9 and 10 may be fully appreciated, the following table sets forth the variable names and the significance of the variables. Unless otherwise noted, all variables are Boolean.

S1: State of switch one array on mat 22 nearest outside of the store.

S2: State of switch array two on mat 22, nearest the inside of the store.

S3: Represents the state of the cash drawer switch, one indicating the drawer is open.

FD: A direction flag is set to one to indicate that switch one closed first.

PST: Present state, a 3-bit variable consisting of FD, S2, S1.

LST: Last state, is the most recent value of PST on the last pass of the program.

NEXT: 3-bits from the state table, represents the next anticipated value for PST.

FE: An error flag indicates that an error condition has arisen in the sequence of closing of the switches.

F1: A flag bit, is set to one when the drawer was open on the last pass of the program.

TIME: (Integer variable) The value of a count in a down counting counter/timer.

TIME2: Same as TIME, used in the example of FIG. 10.

CNTR: (Integer variable) A counter variable.

TOT: (Integer variable) Total number of customers who have entered the store.

NET: (Integer variable) The net number of customers determined to presently be in the store.

LIM: (Integer variable) User definable limit to the value of NET, after which real time recording of video signals from the cameras should occur.

FT: A flag indicating that a timer has been started and not timed out, used in connection with the example of FIG. 10.

FS: A flag which indicates the particular switch which began a timing period indicated by flag FT, is set to zero when switch one initiated the timing.

Turning to FIG. 9, the control of the video format as well as the counting of the number of people at the store location will be described. The program is entered at step 285 labeled (enter from polling). As was described hereinabove, the program controlling CPU 65 is such that all of the I/O devices are regularly polled at a high rate of speed. Thus, the portion of the entire control program illustrated in FIG. 9 will be executed at regularly spaced intervals of time.

The first step 286 is the reading of the state of switches 22 and 25, described hereinabove in connection with FIG. 8. From this point the program enters a block surrounded by dashed line 287 which is a block for testing whether the cash register drawer has been open an excessive period of time, thus calling for real time recording operation of the VCR and selection of full screen display of the appropriate camera. The first step executed is conditional step 288 testing to see if the cash register drawer is open. If it is not, branch 289 is taken and flag F1 is cleared at step 290. The program then exits the cash register routine 287 via line 291.

If YES branch 292 is taken from step 288, indicating that the cash drawer is open, then step 295 is executed testing whether flag F1 is set. As noted in the table above, flag F1 is set to one whenever the cash drawer was open on the last pass through the program. If NO branch 296 is taken, this indicates that the CPU is presently experiencing the first pass through the program for which the cash drawer is open. Thus, the counter timer variable TIME is loaded with a predetermined number N which corresponds to the maximum amount of time that the cash register drawer should be open without generating an alarm condition. This variable is user programmable depending on the experience of the operator of the establishment at which this surveillance system is placed. When this has been completed, flag F1 is set at step 298 and the program branches to exit branch 291.

Next consider an example for which the cash register drawer has been opened during previous passes of the program through routine 287. Under these conditions, branch 310 will be taken from step 295 which means that the cash drawer was open and it was open on the previous pass through the program. This leads to decisional step 311 to test if the timer represented by the variable TIME has timed out. In the event that it has not, branch 312 is taken leading to exit branch 291.

If the timer has in fact timed out, YES branch 315 is taken from step 311. This indicates that an alarm condition has occurred, the cash drawer having been opened for longer than a predetermined period of time. Thus, full screen display and recording of the camera directed at the cash drawer should commence. This is indicated as a block 316 labeled "write selected camera full screen". This step is followed by step 317 which turns on the video cassette recorder in a real time mode. The physical manifestations of these instructions were described in connection with FIG. 8. Therefore, it will be understood that step 316 corresponds to writing a particular word into register 268 (FIG. 8) and step 317 corresponds to writing an appropriate control word into register 215 (FIG. 8).

The time for which the VCR is held on and the full screen is displayed, is under the control of other routines which are not shown in FIG. 9. Implementation of such routines is known to those skilled in the art.

From the foregoing it will be appreciated that all passes through the cash register switch test routine 287 exit on line 291 and go to step 318. At this step, the value of the 3-bit present state (PST) variable is loaded with the value of flag FD and switches S2 and S1. After this, the value of the present state variable is compared to the value of the last state (LST) variable at step 319. If YES branch 320 is taken, this indicates that no change has taken place in the state of the switches or direction flag FD since the last pass of the program, and it is appropriate to return to the polling routine at 321. It should be understood that state comparisons of type shown at step 320 may be made by exclusive OR instructions of the Z80 processor 65 or equivalent steps can be implemented testing the value of each switch separately. Thus, the particular selection of a 3-bit state variable in the example shown in FIG. 9 should not be considered limiting of the present invention.

So long as there is no change in the state of switches S1 and S2, the path through step 319 to the exit point 321 will continue to be followed. Assume next that a change of state of one of the switches takes place. When this occurs, NO branch 322 will be taken from decisional step 319. This leads to conditional step 325 at which the value of the error flag is tested. If the error flag is set, branch 326 is taken. As will become apparent from the immediately following description, the steps bounded by dashed line 327 are those executed when an error condition has been detected and the system is merely waiting for both switches to be open so that it can start again. Thus, it will be apparent that the logic of the control program for counting the number of persons entering and exiting the store is one for which there is a predetermined expected sequence of switch closures. When these fail to occur, the error flag becomes set and the system merely waits until both switches are open again before trying to make a decision as to what activity on the mat caused the unexpected sequence of closures.

The balance of the steps of block 327 include decisional step 328 testing to see if the present state is all zeros. It should be noted that no portion of the program past branch 322 is ever entered unless there is a change of state between the present pass through the program and the most recent pass through the program (PST≠LST). If the present state is not 000, NO branch 329 is taken. This merely indicates that one or both of the switches on the mat remains closed, and the system is still waiting for both switches to be opened before resuming an attempt to count customer traffic.

Branch 329 leads to an exit point shown as 330. As shown on FIG. 9, 330 is logically connected to entry point 331. This leads to step 332 at which the value of the last state viable LST is replaced with the value of the present state variable and the program is exited at point 335 labeled "return to polling". When block 327 is executed for the first time that both of the switches have opened (and the error flag is set), branch 336 is taken to a step which clears the error flag at 337. This leads to entry point 331 at which the value of last state is updated and the system can again attempt to count customer traffic based on the state of the mat switches.

Assume for the moment that there has been a change of state (detected at step 319) and that the error flag is not set. Under these conditions, branch 340 is taken from step 325. First, the last state is tested at step 341 to determine if the beginning of a new sequence of switch closures has occurred which caused branch 322 to be taken. If this step is true, step 342 is executed to determine if the present state is 011 indicating that both switches have suddenly become closed.

If this is true, YES branch 345 is taken to a sequence of steps surrounded by dashed line 346 which are entered whenever the error condition described above is detected. First, the error flag is set at step 347 then direction flag FD is cleared at 348 and the counter is cleared at 349. The reason for setting the error flag is apparent, and the necessity of clearing the counter variable will become apparent from the following description of its use. The direction flag is cleared because it is the state of both switches open and flag FD being equal to zero which is tested at step 328.

Assuming for a moment more normal operation, branch 350 is taken from step 342 leading to step 351. Note that step 351 can only be reached when the last state is all zeros, and the present state is not one in which both switches are closed. This leaves possible values for the present state as either 001 (switch one) or 010 (switch two). The particular switch which closed and caused this portion of the program to be entered is tested at step 351. If YES branch 352 is taken, it is apparent that switch S1 closed first, indicating that the portion of the mat nearest the outside of the store has been stepped on. This leads the system to believe that a person is probably entering the store. Therefore, the direction flag FD is set at step 355, and the program then branches to branch 356 leading to execution of step 357.

At step 357, the value of the variable NEXT is loaded with a value from a state table resident in memory 78 (FIG. 6). As is indicated at step 357 on FIG. 9, this is a function of the present state, PST. The state table is shown on FIG. 9. Arrow 358 indicates the direction in which selection is made. Thus, it should be understood that for any value of the present state shown in the state table, the value immediately below that state is what is loaded into the variable NEXT at step 357.

Entries in the state table are arranged in columns labeled OUT and IN to show the sequence of values loaded into the variable NEXT when the system is detecting a person walking out of the store and into the store, respectively. Examining the state table, and considering the significance of the three bits of each state, the logic behind the state table will become apparent. Since steps 351 and 355 precede the first execution of step 357, the flag bit FD (the most significant bit of each state) will be zero or one according to which one of the switches closed first. This flag is set when it appears that a person is walking into the store and cleared when it appears that a person is walking out of the store.

From this point forward, following the states of switch variables S2 and S1 which are, respectively, the two least significant bits of each state, a person's footsteps can be traced in the bit pattern. For example, when a person is walking out of the store, switch two closes first with switch one open. When the state (010) is the present state, the next expected state is when the person has one foot on each appropriate portion of the mat, thus having both switches closed. Thus, the next expected state is 011 is shown in the state table. As a person continues walking, their more rearward foot will be lifted off of switch two while their forward foot is still on switch one causing state 001 to be the next expected state. When the person finally leaves the mat completely, state 000 is expected.

Keeping in mind that direction flag FD is set to one when switch one is first closed, the corresponding sequence of expected states in response to a person walking across the mat in a direction into the store may be appreciated from the IN column of the state table. Thus, depending on the present state, the next expected state is loaded into the variable NEXT. From this point forward, the control program continues to execute these operations, and counts the number of times a state change occurs and the next expected state is the state which occurred.

Of course, once step 357 is executed, the last state variable is updated and the program returns to polling at steps 332 and 335. Assume yet another pass through the program for which a state change is detected at step 319. Further assume that the last state was not 000 so that branch 359 is taken from step 341. This leads to step 360 which tests to see if the new present state is equal to the expected next state established during the most recent execution of step 357. If it is not, an error condition is assumed and branch 361 is taken to block 346, which was described above. From this point forward the error flag is set and the apparatus merely waits for detection of a new occurrence of the all zero state at step 328 before trying again.

Again assuming normal operation, branch 362 will be taken from step 360 indicating that the new present state is indeed the one expected. The value of the counter variable CNTR is incremented at step 365. The variable CNTR merely counts the number of times the change of state occurs in the expected fashion. From examination of the state table and how the program reaches step 375, it will be apparent that the value of three for variable CNTR indicates that the entire sequence of expected switch closings has occurred and the apparatus should either add or subtract a person from the net count within the store.

The value of variable CNTR is tested at step 366. If it has not yet arrived at three, the NO branch is taken to step 356, causing the value of NEXT and LST to be updated. If the YES branch is taken from step 366 then the value of the direction flag FD is tested at step 368. If it is equal to zero, it indicates that a person has walked out of the store and YES branch 369 is taken to step 370. At step 370, the net count of the people in the store (represented by the variable NET) is decremented and the program moves to branch 371 at which the direction flag and the counter variable are cleared. Branch 371 is taken whenever the apparatus has successfully counted a person entering or exiting the store, and it is appropriate to reset the direction flag and the counter variable, waiting for another person to step on mat 22.

If the direction flag is set, NO branch 372 is taken. This leads to branch 375 at which the total customer count represented by the variable TOT, is incremented. The value of NET is incremented at step 376. This leads to step 377 which tests to see if the net number of the people the system has counted as being in the store exceeds the predetermined limit established by the variable LIM. If it does not, branch 378 is taken to branch 371, thus resetting the flags and the counter.

If the value of NET exceeds the value of LIM, step 379 is executed. As noted on FIG. 9, step 379 is one in which cameras to go a "real time routine" which is not described in detail. Suffice it to say that the VCR will begin recording in real time, as opposed to the time lapse mode, through instruction written into register 215 (FIG. 8). Under the control of the user, particular cameras may be selected to record activities in certain portions of the establishment when the VCR enters real time recording in response to detection of a large number of people in the store. For example, full screen recording and display of the image from a camera directed on merchandise which is commonly subject to shoplifting could take place under these conditions. Once step 379 has been taken, the program again branches to branch 371 resetting the apparatus for a new set of switch closures.

From the foregoing it will be readily appreciated that the novel mat 22 illustrated in FIGS. 4 and 5, together with the control logic shown in FIG. 9 operating CPU 65 (FIG. 6) provide a significant improvement in the ability of a surveillance system to detect persons entering and exiting the store over the conventional counting of openings and closures of the entrance door. The system is not foolproof since it will only count in response to the expected sequence of switch closures from a person walking across the mat in a normal fashion. For example, a person entering in a wheelchair, or a delivery person rolling a hand truck across the mat will not be properly counted since (assuming the store is being entered) the sequence of states to be encountered will be 101, 100, 110, rather than the expected sequence shown in the state table of FIG. 9.

An alternate implementation of logic for counting customers is shown in FIG. 10. This, under many circumstances, can overcome the inability of the control logic of FIG. 9 to detect events such as the person in the wheelchair crossing the mat. On FIG. 9, an exit point shown in phantom as B is illustrated as 380. If the alternate implementation of the detection and control logic of FIG. 10 is implemented, the program would go to entry point B, labeled as 381 on FIG. 10 whenever branch 291 (FIG. 9) was encountered. FIG. 10 illustrates an alternate arrangement in which detection of a switch closure is first made. Once closure is detected, a timer (variable TIME2) is started, and a flag (FT) is set indicating that the timer is running.

The logic of the routine of FIG. 10 is merely to determine if the other switch of the pair S1, S2 has been closed within a predetermined time of the first switch being closed. If it is, the total and net counts are updated according to the sequence of closures which led to the determination that a person has crossed the mat. From step 381, the states of switches S1 and S2 are tested on each pass through the program at steps 385 and 386. If neither of the switches are closed, branch 387 will be taken which leads to exit point 388. Thus, the alternative logic of FIG. 10 is one in which testing is done only in response to one of the mat switches being closed rather than in response to a change of state.

If either one of the tests implemented by steps 385 and 386 is true, the program branches to step 389 at which flag FT is tested. Flag FT is set to one whenever timing is in progress. Assuming for a moment that the flag is not set, NO branch 390 is taken indicating that it is appropriate to start the above-mentioned timer. When this occurs, flag FT is set at step 391 and the timer variable TIME2 is loaded with a predetermined number N at step 392 corresponding to the maximum allowable time defined by the system during which it is expected that the other switch will be closed in response to a person traveling across the mat.

Next the particular switch which caused the predetermined timing period to begin is tested at step 395. If it is switch S2, flag FS is set at step 396 and the program reaches exit point 388 via branch 397. If the result of step 395 is negative, the program merely moves to branch 397 leaving the flag FS cleared. The program will only reach branches 395 and 396 in response to the first closure of one of switches S1 or S2 which initiates a timing period.

Consider for a moment the next pass through the program. Under these conditions, YES branch 398 is taken from step 389 to step 399 at which it is tested to see if the timer has timed out. Assuming for the moment that it has not, branch 400 is taken to step 401 which begins a series of steps which test to see if the switch closure which caused the program to enter branch 398 is a new switch closure or merely one previously detected during the last pass through the program. This is accomplished by testing the value of the directional flag FS. If the flag FS is equal to zero, branch 402 is taken to step 405.

Keeping in mind that flag FS will be zero when switch S1 began the present timing period, step 405 tests to see if switch S2 is closed. If it is not, the CPU has merely detected the same, or a subsequent, closure of switch S1. In either case, closure of switch S1 began the timing period and it is determined that S2 is not closed at step 405. Thus, NO branch 406 is taken leading to exit point 388. Similarly, if NO branch 407 is taken from step 401, this indicates that closure of switch two first initiated the present timing period and only the state of switch S1 need be tested at step 408. If this step is negative, the program branches to 397 and exits at 388.

It will be appreciated that either of the above-described sequences of steps will be taken many times when a person first steps on one of the switches on mat 22. However, because of steps 401, 405 and 408, no counting of persons going in and out of the store will take place until the switch which differs from the one which initiated the timing period becomes closed. In the event that either step 405 or 408 provides a true test, the appropriate incrementing or decrementing of the variables TOT and NET take place. If YES branch 410 is taken from step 405, the total variable TOT is incremented at 411 and NET is increased by one at 412. If YES branch 415 is taken from step 408, this indicates that a pserson has walked out of the store and the value of NET is decremented at 416. Both steps 412 and 416 lead to a block labeled "routines based on NET". This is referenced by numeral 379' indicating that the appropriate routines correspond to routines described in connection with step 379 of FIG. 9.

From the foregoing description it will be apparent that the present invention achieves the objects set forth above and overcomes the above-noted drawbacks of prior art surveillance systems. Based on the foregoing disclosure, other implementations of the present invention will suggest themselves to those skilled in the art and thus, the scope of the invention is limited only by the claims below.

We claim:

1. In a surveillance system including a plurality of cameras for providing video signals corresponding to images of a monitored device, at least one video signal recording device selectively operable for recording said video signals in response to a record signal, event detection means for producing a plurality of event signals in response to selective operation of said monitored device; an improved controller comprising in combination:

timer means connected to said event detection means for measuring a selected predetermined time interval in response to said event detection means providing a first one of said plurality of event signals, and for providing said record signal in response to termination of said predetermined time interval during which said event detection means failed to provide a second particular one of said plurality of event signals.

2. In a surveillance system including a plurality of cameras for providing a plurality of video signals representative of images of a plurality of monitored devices to a display device, event detection means for providing an event signal in response to selective operation of one of said monitored devices; the improvement comprising in combination:

multiplexer means for connecting said plurality of cameras to said display device for causing said display device to display visible representations of at least two of said plurality of video signals;

said multiplexer means including control means connected to said event detection means for causing said display device to display visible representations of only one of said plurality of video signals in response to said event signal.

3. In a surveillance system including at least one camera for providing video signals corresponding to images of a monitored area, at least one video signal recording device selectively operable for recording said video signals, and information and storage means for detecting events and storing information about said events; an improved event detection apparatus for providing a directional count signal indicative of a number of persons who have passed through a predetermined portion of said monitored area along a predetermined travel axis comprising:

a mat structure; said mat structure including at least two planar switch arrays spaced apart along said travel axis, each of said planar switch arrays extending transversely from said travel axis;

detection means connected to said planar switch arrays for detecting closure conditions in said planar switch arrays;

timing and counting generating means connected to said detection means for providing said directional count signal in response to said detection means detecting a particular closure condition of a first one of said planar switch arrays, followed by detection of said particular closure condition of the other of said planar switch arrays within a predetermined time of said detection of said closure condition of said first particular planar switch array.

4. In a surveillance system including at least one camera for providing video signals corresponding to images of a monitored area, at least one video signal recording device selectively operable for recording said video signals, and information and storage means for detecting events and storing information about said events; an improved event detection apparatus for providing a directional count signal indicative of a number of persons who have passed through a predetermined portion of said monitored area along a predetermined travel axis comprising:

a mat structure; said mat structure including at least two planar switch arrays spaced apart along said travel axis, each of said planar switch arrays extending transversely from said travel axis;

detection means connected to said planar switch arrays for detecting closure conditions in said planar switch arrays;

count generating means connected to said detection means for providing said directional count output in response to said detection means detecting a particular closure condition of only a first one of said planar switch arrays, followed in time by a simultaneous occurrence of said particular closure condition of both of said planar switch arrays, followed in time by said particular closure condition of only the other of said planar switch array.

5. In a surveillance system including a plurality of cameras for providing a plurality of video signals representative of images of a plurality of monitored devices to a display device, event detection means for providing an event signal in response to selective operation of one of said monitored devices; the improvement comprising in combination:

storage means for storing a particular one of a plurality of camera select signals in response to said event signal;

multiplexer means for connecting said plurality of cameras to said display device for causing said display device to display visible representations of at least two of said plurality of video signals in response to none of said plurality of camera select signals being stored in said storage means, and alternately for causing said display device to display visible representations of only a particular one of said plurality of video signals from a particular one of said plurality of cameras corresponding to said particular camera select signal when said particular camera select signal is stored in said storage means.

6. In a surveillance system including a plurality of cameras for providing a plurality of video signals at a plurality of camera outputs, a display device for displaying visible signals corresponding to video signals provided to a display input, and data generating means connected to at least one monitored device in an area within the field of view of at least one of said cameras for generating real time data signals corresponding to a transaction selectively performed on said monitored device; and improved video controller comprising in combination:

a CRT controller for providing cyclic raster timing signals to at least one timing signal output of said CRT controller and for defining a periodic complete raster scan;

a processor connected to and comprising a part of said data generating means, said processor being asynchronous to said CRT controller;

an addressable memory for storing said data signals as stored data signals under the control of said processor;

address translation means interposed between said timing signals output and the address inputs of said addressable memory for causing said stored data signals to be read out of said addressable memory during a predetermined portion of said raster scan and for providing programmed counter signals;

character generating means connected to said addressable memory and to said display input for providing character signals corresponding to said stored data signals to a character output;

register means connected to said processor for storing a display mode control signal and a display select output provided by said processor and providing same to a display control output;

camera select means connected to said address translation means for providing a plurality of camera select output signals during a plurality of additional predetermined portions of said raster scan different from said first predetermined portion of said raster scan, including a first camera select output signal which is active only during said first predetermined portion of said raster scan, in response to said programmed counter signals;

gating means responsive to said first camera select output signal and said display mode control signal to provide a multiplexer control signal, said multiplexer control signal alternately being in a first state and a second state;

multiplexer means connected to said camera outputs, said character output, said display control output for connecting said character signals to said display input during said predetermined portion of said raster scan and for providing, when said multiplexer control signal is in said first state;

said plurality of video signals from said cameras to said display input in response to said camera select output signals during said plurality of additional predetermined portions of said raster scan, and for providing, when said multiplexer control signal is in said second state;

said character signals to said display input during said additional predetermined portions of said raster scan when said display select signal is in a first state and providing a particular one of said plurality of said video signals from one of said cameras to said display input when said display select signal is in a second state.

7. In a surveillance system including a plurality of cameras for providing a plurality of video signals at a plurality of camera outputs, a display device for displaying visible signals corresponding to video signals provided to a display input, and data generating means connected to at least one monitored device in an area within the field of view of at least one of said cameras for generating real time data signals corresponding to a transaction selectively performed on said monitored device; an improved video controller comprising in combination:

a CRT controller for providing cyclic raster timing signals to at least one timing signal output of said CRT controller and for defining a periodic complete raster scan;

a processor connected to and comprising a part of said data generating means;

an addressable memory for storing said data signals as stored data signals under the control of said processor;

address translation means interposed between said timing signals output and the address inputs of said addressable memory for causing said stored data signals to be read out of said addressable memory during a predetermined portion of said raster scan and for providing programmed counter signals;

character generating means connected to said addressable memory and to said display input for providing character signals corresponding to said stored data signals to a character output;

character generating means connected to said addressable memory and to said display input for providing character signals corresponding to said stored data signals to a character output;

register means connected to said processor for storing a display control signal provided by said processor and providing same to a display control output;

multiplexer means connected to said camera outputs, said character output, said display input and said display control output for connecting said character signals to said display input during said predetermined portion of said raster scan and for connecting said camera outputs to said display input for the remainder of said raster scan when said display control signal is in a first state, and alternately for connecting said character signals to said display input for all of said raster scan when said display control signal is in a second state distinct from said first state.

8. An improved video controller as recited in claim 7 wherein said predetermined portion of said raster scan is a first predetermined portion and further comprising:

camera select means connected to said address translation means for defining a plurality of additional predetermined portions of said raster scan, each being distinct from said first predetermined portion, and for connecting different ones of said plurality of camera outputs to said display input for different ones of said additional predetermined portions of said raster scan in a predetermined sequence in response to said programmed counter signals.

9. An improved video controller as recited in claim 7 wherein:

said address translation means includes a read only memory.

10. An improved video controller as recited in claim 7 wherein:

said camera selection means includes a read only memory.

11. An improved video controller as recited in claim 10 wherein:

said camera selection means further comprises a plurality of selectively operable switches.

12. An improved video controller as recited in claim 7 wherein said predetermined portion of said raster scan is a first predetermined portion and further comprising:

camera select means connected to said address translation means for providing a plurality of camera select output signals during a plurality of additional predetermined portions of said raster scan different from said first predetermined portion of said raster scan in response to said programmed counter signals;

wherein said multiplexer means comprises a first multiplexer having a first set of inputs connected to said camera select output signals and a second set of inputs connected to said register means and a set of outputs connected to the select inputs of a second multiplexer;

said second multiplexer having a first set of inputs connected to said plurality of camera outputs and at least one second input connected to said character output.

13. An improved video controller as recited in claim 12 wherein:

said camera select output signals include a first camera select output signal which is in a first state during said first predetermined portion of said raster scan;

said display control signal from said register means includes a display mode control signal and a display select signal, further comprising;

gating means responsive to said first camera select output signal and said display mode control signal to provide a multiplexer control signal to the select inputs of said first multiplexer, said multiplexer control signal alternately being in a first state in which said first multiplexer provides said camera select signals to the inputs of said second multiplexer during said plurality of additional predetermined portions of said raster scan, and in a second state in which said first multiplexer provides said display select signal to the select input of said second multiplexer during said additional predetermined portions of said raster scan.

* * * * *